US012585059B1

(12) United States Patent
Choi et al.

(10) Patent No.: US 12,585,059 B1
(45) Date of Patent: Mar. 24, 2026

(54) DISPLAY DEVICE

(71) Applicant: LG Display Co., Ltd., Seoul (KR)

(72) Inventors: Eun Hee Choi, Paju-si (KR); Jin Ryun Kim, Paju-si (KR); Ji Gon Kim, Paju-si (KR); Yong Seok Lee, Paju-si (KR); Dae Yong Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/004,118

(22) Filed: Dec. 27, 2024

(30) Foreign Application Priority Data

Dec. 29, 2023 (KR) ........................ 10-2023-0197867

(51) Int. Cl.
*F21V 8/00* (2006.01)

(52) U.S. Cl.
CPC ......... *G02B 6/0055* (2013.01); *G02B 6/0068* (2013.01)

(58) Field of Classification Search
CPC .... G02B 6/0055; G02B 6/0051; G02B 6/005; G02B 6/0031; G02B 5/28; G02B 5/0278; G02B 13/14; G02B 6/0053; G02B 5/26; G02B 6/0088; F21V 8/00
See application file for complete search history.

(56) References Cited

U.S. PATENT DOCUMENTS

| | | | |
|---|---|---|---|
| 2021/0144313 A1* | 5/2021 | Large | H04N 25/11 |
| 2021/0294015 A1 | 9/2021 | Yin et al. | |
| 2022/0026625 A1 | 1/2022 | Shimokawa et al. | |
| 2023/0267761 A1* | 8/2023 | Chen | H04M 1/0266 |
| | | | 382/124 |

FOREIGN PATENT DOCUMENTS

| | | |
|---|---|---|
| CN | 115598880 A | 1/2023 |
| KR | 10-2017-0101994 A | 9/2017 |
| KR | 10-2017-0139241 A | 12/2017 |
| KR | 10-2022-0047638 A | 4/2022 |

* cited by examiner

*Primary Examiner* — William J Carter

(74) *Attorney, Agent, or Firm* — Birch, Stewart, Kolasch & Birch, LLP

(57) ABSTRACT

A display device can include a backlight unit, a display panel disposed on the backlight unit and including a first display area and a second display area, and a sensor disposed under the second display area. The backlight unit includes a light guide plate disposed under the first display area and the second display area, a light source configured to radiate light to the light guide plate, and a reflector disposed between the second display area and the sensor and reflecting incident visible light to the second display area.

18 Claims, 16 Drawing Sheets

DISPLAY DEVICE

CROSS-REFERENCE TO RELATED APPLICATION

This application claims priority to Korean Patent Application No. 10-2023-0197867, filed in the Republic of Korea on Dec. 29, 2023, the disclosure of which is hereby expressly incorporated herein by reference in its entirety into the present application.

BACKGROUND

Field

Embodiments of the present disclosure relate to a display device.

Discussion of the Related Art

As the information society develops, a demand for display devices to display images is increasing in various forms, and recently, various display devices such as liquid crystal display devices (LCD), plasma display panels (PDP), and organic light emitting display devices (OLED) have been utilized.

Recently, multimedia functions of electronic devices such as mobile terminals have been improving. For example, cameras are being embedded in mobile terminals as a basic feature, and the resolution of the cameras is increasing to the level of related digital cameras. However, a front camera of a mobile terminal can limit a screen design, making the screen design difficult. In order to reduce a space occupied by the camera, screen designs including a notch or a punch hole have been adopted for mobile terminals, but a screen size can still be limited due to the camera, making it difficult to implement a full-screen display.

In order to implement the full-screen display, a method of providing an imaging area disposed with low-resolution pixels in a screen of a display panel and disposing a camera and/or various sensors in the imaging area has been proposed.

SUMMARY OF THE DISCLOSURE

An embodiment of the present disclosure is directed to providing a display device in which an imaging area is not visible from the outside.

In addition, an embodiment of the present disclosure is directed to providing a display device with an improved dark area phenomenon through a reflector while maintaining the performance of a camera.

In addition, an embodiment of the present disclosure is directed to providing a display device that can be easily miniaturized through an extending portion.

The objects of embodiments of the present disclosure are not limited thereto and can also include objects or effects that can be identified from the configurations or embodiments to be described below.

A display device according to some embodiments of the present disclosure includes a backlight unit, a display panel disposed on the backlight unit and including a first display area and a second display area, and a sensor disposed under the second display area, wherein the backlight unit includes a light guide plate disposed under the first display area and the second display area, a light source configured to radiate light to the light guide plate, and a reflector disposed between the second display area and the sensor and reflecting incident visible light to the second display area.

According to aspects of the present disclosure, light emitted from the sensor can pass through the reflector.

According to aspects of the present disclosure, the light emitted from the sensor can be emitted to the outside by passing through the display panel, reflected from an external object, and received by the sensor. The sensor can include an infrared camera.

According to aspects of the present disclosure, the display device can further include an optical sheet disposed on the backlight unit, wherein the optical sheet can include an opening corresponding to the second display area.

According to aspects of the present disclosure, the light source can be disposed on one side of the light guide plate, and the reflector can be disposed on the other side facing the one side of the light guide plate. The light guide plate can include a sloped surface disposed on the other side thereof, and the reflector is disposed on the sloped surface. The sloped surface can be disposed in an area overlapping the sensor.

According to aspects of the present disclosure, the reflector can reflect light incident on the light guide plate to the second display area. The light guide plate can include an upper surface and a lower surface that are connected to the sloped surface. The sloped surface may not overlap the lower surface. A thickness of the light guide plate can increase toward the other side.

According to aspects of the present disclosure, the light guide plate can include a flat surface extending to a side opposite to the light source, and the flat surface can overlap the second display area. A thickness of the light guide plate on the flat surface can be less than or equal to a thickness of the light guide plate on the sloped surface.

According to aspects of the present disclosure, the display device can further include a first prism disposed between the sloped surface and the sensor. The sloped surface may not overlap the upper surface, and the display device can further include a light-emitting unit disposed on the other side of the light guide plate According to aspects of the present disclosure, the thickness of the light guide plate can decrease toward the other side thereof. The display device can further include a second prism disposed between the sloped surface and the display panel.

According to aspects of the present disclosure, the display device can further include a light-emitting unit disposed on the other side of the light guide plate, and the second prism can be disposed between the reflector and the light-emitting unit.

According to aspects of the present disclosure, the reflector can reflect light output from the light source to the sensor, and the reflector can reflect light output from the light-emitting unit to the display panel. The light guide plate can include a patterned area overlapping the first display area and having a pattern, and a non-patterned area overlapping the second display area.

According to aspects of the present disclosure, the optical sheet can overlap the patterned area and the non-patterned area. The optical sheet can be misaligned with the non-patterned area. The reflector can reflect light in a visible wavelength band and transmit light in an infrared wavelength band. The reflector can overlap an area overlapping an opposing incident light portion of the first display area and the second display area.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a perspective view of a display device according to an embodiment of the present disclosure;

FIG. 7 is a modified example of FIG. 3;

FIG. 8 is a view for describing a function of a sensor in the display device according to the embodiment;

DETAILED DESCRIPTION OF THE EMBODIMENTS

Figure 2A:
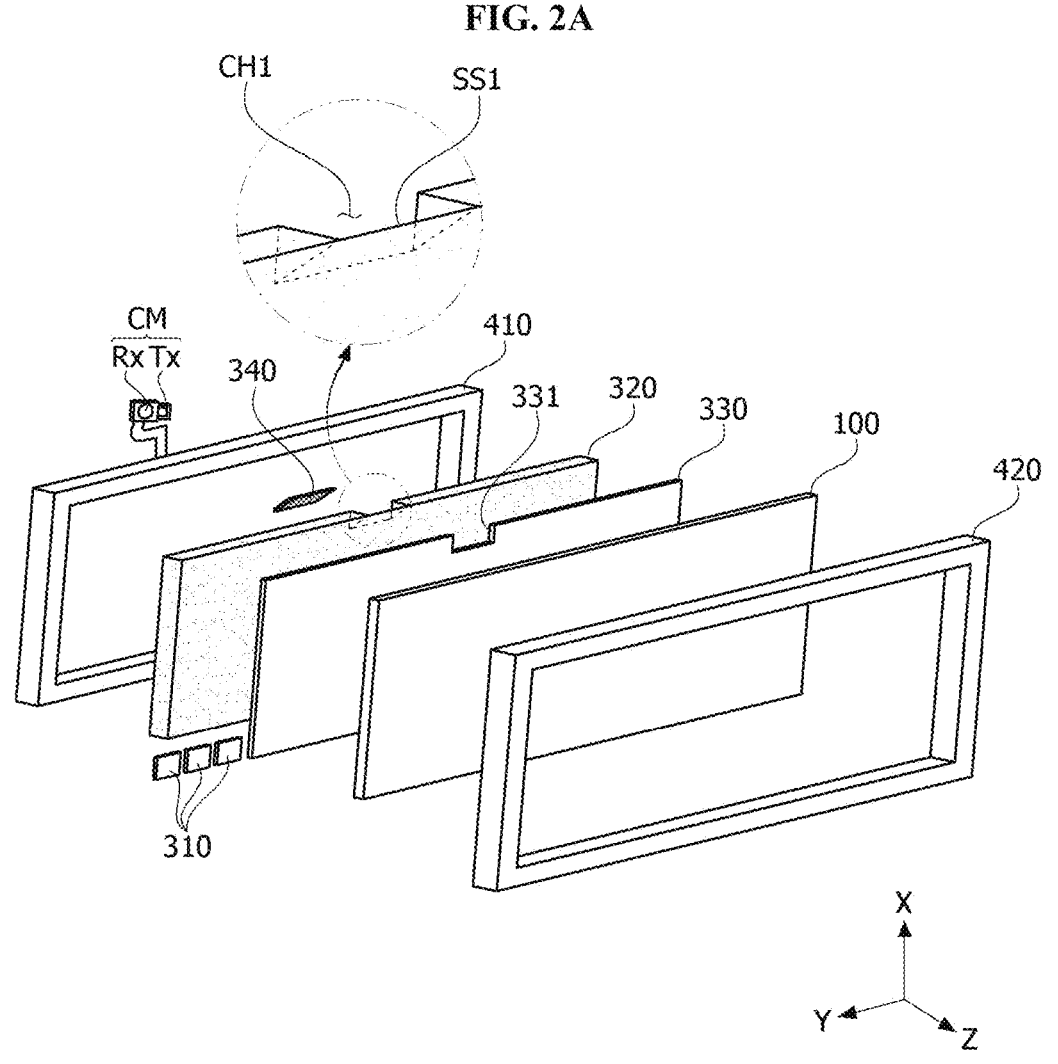
FIG. 2A is an exploded perspective view of the display device according to the embodiment of the present disclosure.

Hereinafter, example embodiments according to the present disclosure will be described in detail with reference to the accompanying drawings.

However, the technical spirit of the present disclosure is not limited to some of the described embodiments, but can be implemented in various different forms, and one or more of the components among the embodiments can be used by being selectively coupled or substituted without departing from the scope of the technical spirit of the present disclosure.

In addition, terms (including technical and scientific terms) used in embodiments of the present disclosure can be construed as meaning that can be generally understood by those skilled in the art to which the present disclosure pertains unless explicitly specifically defined and described, and the meanings of the commonly used terms, such as terms defined in a dictionary, can be construed in consideration of contextual meanings of related technologies.

In addition, the terms used in the embodiments of the present disclosure are for describing the embodiments and are not intended to limit the present disclosure.

In the disclosure, a singular form can include a plural form unless otherwise specified in the phrase, and when described as "at least one (or one or more) of A, B, and C," one or more among all possible combinations of A, B, and C can be included.

In addition, the terms, such as first, second, A, B, (a), and (b) can be used to describe components of the embodiments of the present disclosure.

These terms are only for the purpose of distinguishing one component from another component, and the nature, sequence, order, or the like of the corresponding components is not limited by these terms.

In addition, when a first component is described as being "connected," "coupled," or "joined" to a second component, it can include a case in which the first component is directly connected, coupled, or joined to the second component, but also a case in which the first component is "connected," "coupled," or "joined" to the second component by other components present between the first component and the second component.

In addition, when a certain component is described as being formed or disposed on "on (above)" or "below (under)" another component, the terms "on (above)" or "below (under)" can include not only a case in which two components are in direct contact with each other, but also a case in which one or more other components are formed or disposed between the two components. In addition, when described as "on (above) or below (under)," it can include the meaning of not only an upward direction but also a downward direction with respect to one component. Further, the term "can" fully encompasses all the meanings and coverages of the term "may."

Various examples of a display device according to the present disclosure will now be discussed referring to the drawings. All the components of each display device according to all embodiments of the present disclosure are operatively coupled and configured.

Figure 1:
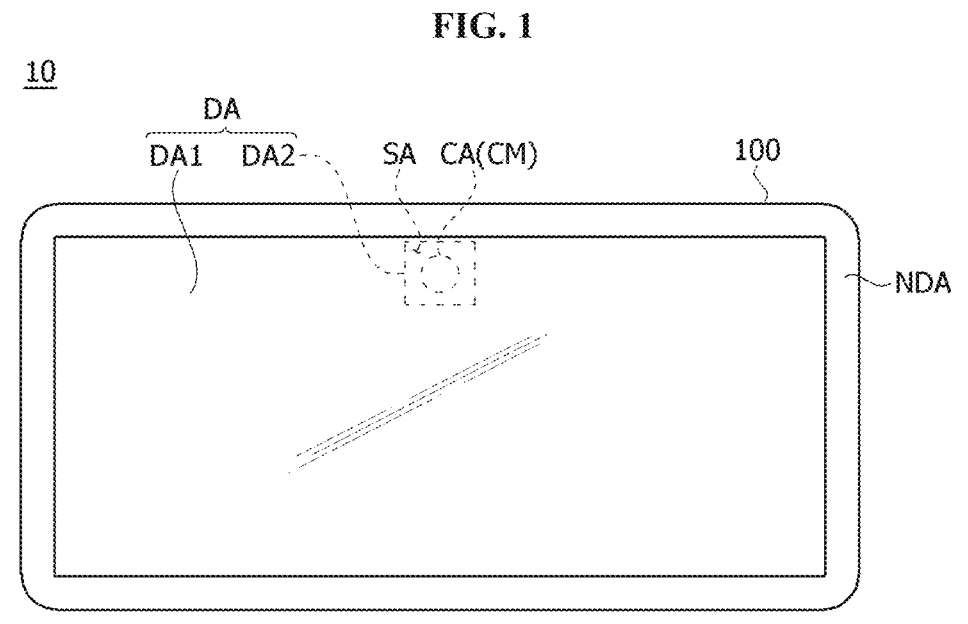

FIG. 1 is a perspective view of a display device according to an embodiment of the present disclosure.

Referring to FIG. 1, a display device 10 according to the embodiment can include a display panel 100 for displaying images and a sensor CM for capturing images. The display device 10 of the embodiment can be applied to various electronic devices such as smartphones, tablets, smart pads, TVs, and monitors.

The display panel 100 can include a display area DA including a plurality of sub-pixels and a non-display area NDA located at at least one side of the display area DA. As shown, the non-display area NDA is disposed on a portion of the display panel 100, but is not limited thereto. The non-display area NDA can surround the display area DA entirely or only in part(s).

The display area DA can include a first display area DA1 and a second display area DA2. A plurality of pixels in the first display area DA1 can emit light, and images can be displayed by the emitted light. The second display area DA2 can overlap the sensor CM. The second display area DA2 can include a sensing area CA overlapping the sensor CM and a surrounding area SA adjacent to the sensing area CA.

The sensor CM can be placed under the display panel 100. The sensor CM can be disposed to be spaced apart from the display panel 100. In addition, an area of the second display area DA2 is formed to be larger than an area of the sensor CM, but is not limited thereto. For example, the second display area DA2 and the sensor CM can be formed to have substantially the same area, or the second display area DA2 can be formed to be smaller than the sensor CM.

In addition, the sensor CM is formed to overlap an upper area of the display area DA, but is not limited to thereto. The location of the sensor CM can vary under the display panel 100 depending on an electronic device to which the display device 10 is applied. For example, the sensor CM can overlap un upper left area or upper central area of the display area DA. Corresponding to the location of the sensor CM, the second display area DA2 can also be disposed in the upper center area.

Figure 2B:
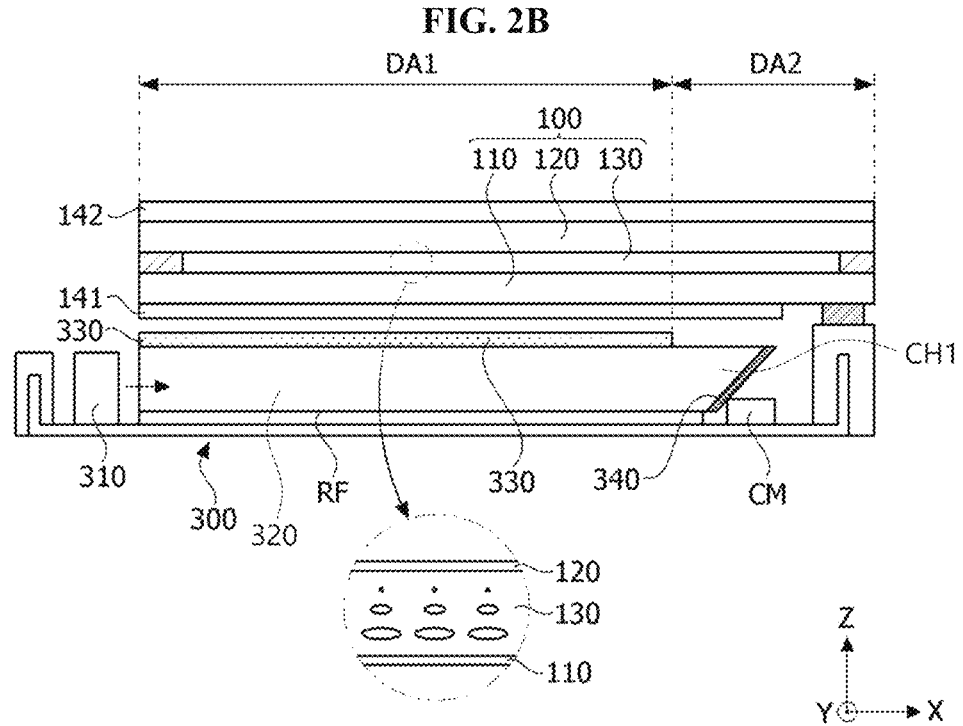
FIG. 2B is a schematic cross-sectional view of the display device according to the embodiment of the present disclosure.

FIG. 2A is an exploded perspective view of the display device according to the embodiment of the present disclosure. FIG. 2B is a schematic cross-sectional view of the display device according to the embodiment of the present disclosure.

Referring to FIGS. 2A and 2B, the display device 10 according to the embodiment can include a backlight unit 300, a display panel 100, and a case member.

The display panel 100 can include a lower substrate 110, an upper substrate 120, and a liquid crystal layer 130 interposed between the lower substrate 110 and the upper substrate 120. The lower substrate 110 and the upper substrate 120 can be formed of glass or plastic.

Signal lines and pixels can be provided on the display panel 100. The signal lines can include data lines and gate lines that intersect each other, a common line for supplying a common voltage to common electrodes, and gate control signal lines for supplying a control signal to a gate driving circuit. Pixels can be disposed in intersection areas of the data lines and the gate lines. Each of the pixels can include a thin film transistor (TFT), a pixel electrode, and a common electrode. The thin film transistor can supply a data voltage of the data line to the pixel electrode in response to a gate signal of the gate line.

A liquid crystal of the liquid crystal layer 130 can be driven by an electric field generated by a potential difference between the data voltage supplied to the pixel electrode and the common voltage supplied to the common electrode, thereby adjusting the transmission amount of light incident from the backlight unit. The liquid crystal display panel can be applied to various related panel structures without limitation.

A black matrix and a color filter can be provided on the upper substrate 120 of the display panel 100. A lower surface of the upper substrate 120 can be a surface facing the lower substrate 110. As described below, the display panel 100 can have a flip-type structure in which the black matrix and color filter are disposed on the upper substrate 120.

In addition, the common electrode can be provided on the lower surface of the upper substrate 120 in a vertical electric field driving method such as a twisted nematic (TN) mode and a vertical alignment (VA) mode, and provided on the upper surface of the lower substrate in a horizontal electric field driving method such as an in plane switching (IPS) mode and a fringe field switching (FFS) mode.

Since the black matrix is formed of a light blocking material in a matrix structure, light leakage to an area other than a pixel area can be blocked. The color filter can be located between the black matrices in the pixel area. The color filter can include a red color filter, a green color filter, and a blue color filter.

An upper polarizing plate 142 can be located on the upper substrate 120 of the display panel 100. In addition, a lower polarizing plate 141 can be located on the lower substrate 110 of the display panel 100. A light transmission axis of the upper polarizing plate 142 can intersect or can be orthogonal to a light transmission axis of the lower polarizing plate 141. In addition, an alignment layer for setting a pre-tilt angle of the liquid crystal can be disposed on inner surfaces of the upper substrate 120 and the lower substrate 110 that are in contact with the liquid crystal.

The backlight unit 300 can include a light source 310, a light guide plate 320, a reflective sheet RF, an optical sheet 330, and a reflector 340, etc. The backlight unit 300 can convert light emitted from the light source 310 into a uniform surface light source through the light guide plate 320 and the optical sheet 330 and provide the light to the display panel 100. The backlight unit 300 is described as being implemented in an edge type, but is not limited thereto and can also be implemented in a direct type.

The light source 310 can be singular or plural. The light source 310 can be implemented as a light emitting diode (LED). In this case, the light emitting diode can output light in various wavelength bands. For example, the light emitting diode can include at least one of a blue light emitting diode outputting blue light, a red light emitting diode outputting red light, and a magenta light emitting diode outputting magenta light which is a mixture of blue light and red light. The light source 310 can include a wavelength conversion layer that converts a wavelength of the light emitted from the light-emitting diode. Therefore, the light incident from the light source to the light guide plate can be converted into white light.

The light guide plate 320 can convert the light emitted from the light source 310 into the surface light source and provide the light to the display panel 100. The reflective sheet RF can be disposed on a lower surface of the light guide plate 320 to reflect light directed downward from the light guide plate 320.

The optical sheet 330 can be disposed between the light guide plate 320 and the display panel 100. The optical sheet 330 can include at least one prism sheet or at least one diffusion sheet. The optical sheet 330 can diffuse light incident from the light guide plate 320 and refract an optical path so that the light is incident at an angle substantially perpendicular to a light incident surface of the display panel 100.

The reflector 340 can be disposed obliquely in the second display area DA2. In particular, the reflector 340 can be disposed obliquely with respect to a direction from the light source 310 toward the light guide plate. In addition, the reflector 340 can be disposed obliquely with respect to the upper surface and the lower surface of the light guide plate 320. For example, the reflector 340 can be disposed on a sloped surface formed at an end portion of the light guide plate 320. The reflector 340 and the sloped surface of the light guide plate 320 can be formed to be inclined at a predetermined angle other than a right angle with respect to the upper surface and the lower surface of the light guide plate 320.

The light guide plate 320 can have a chamfered portion CH1 formed in an area overlapping the second display area DA2 so that the reflector 340 is disposed thereon. The chamfered portion CH1 can be formed at an end portion of the light guide plate 320 and can have a sloped surface SS1.

The reflector 340 may not be parallel to a direction (an X-axis direction) from the light source 310 toward the light guide plate 320. For example, the reflector 340 can have a surface (a lower surface or a surface in contact with the sloped surface) that is misaligned with the direction from the light source 310 toward the light guide plate 320. In addition, a reflecting surface of the reflector 340 can form a predetermined angle by intersecting with the direction from the light source 310 towards the light guide plate 320.

The optical sheet 330 can include an opening 331 formed in an area corresponding to the sensor or the second display area DA2. Therefore, the opening 331 of the optical sheet 330 can overlap the chamfered portion CH1 of the light guide plate 320. However, the present disclosure is not necessarily limited to thereto, and the opening may not be formed in the optical sheet 330. For example, the optical sheet 330 can also be present in an area overlapping with the sensor (or the second display area), thereby allowing the optical sheet 330 to overlap the sensor (or the second display area).

The sensor CM can include a transmitting unit Tx and a receiving unit Rx. The sensor CM can be referred to as "a camera module,", "a camera sensor,", "a camera unit,", etc. For example, the sensor CM can be an infrared camera. Alternatively, the sensor CM can be an infrared sensor (IR sensor).

The transmitting unit Tx of the sensor CM can radiate infrared ray (IR). The receiving unit Rx can receive the reflected light of the radiated infrared ray reflected from an object (e.g., a person, etc.). Therefore, the sensor CM can adjust the amount of light depending on an intended use or a distance to a user. The amount of light of the sensor CM can have an optimal amount of light based on the intended use or the distance to the user. The sensor CM according to various embodiments can be operated using a preset optimal amount of light corresponding to the intended use or the distance from the user.

In addition, the sensor CM can extract characteristics of a subject. According to various embodiments, the sensor CM can generate image data, etc. that can recognize that the subject is the user's face when the subject is a user's face by receiving the reflected light. In addition, the sensor CM can generate data distinguishing a direction of a face and a location of the face. For example, the sensor CM can generate or extract data to identify a shape of the face and identify locations of eyes, a nose, a mouth, a forehead, etc. of the face. In addition, the recognition of the subject, the extraction and the generation of data, etc. can be performed in the display device or an electronic device that are provided with the sensor CM, not in the sensor CM. In the above description, the subject was described as the user's face, but is not limited thereto. In addition, the sensor CM can extract not only the characteristics of the subject but also a heart rate, iris information, etc. and extract various pieces of other subject information.

The case member can include a bottom cover 410, a support frame, and a top cover 420.

The bottom cover 410 can have a structure that surrounds the backlight unit 300 or the display panel 100. For example, the bottom cover 410 can be a quadrangular frame. In addition, the bottom cover 410 can be formed of various materials. For example, the bottom cover 410 can be formed of metal. Therefore, reliability of the display device can be improved.

The support frame can support the lower surface of the lower substrate of the display panel 100. The support frame can also be referred to as a guide panel or a guide frame. The support frame can be shown as "G" in FIG. 3. The support frame can be fixed by being coupled by the bottom cover 410 and a fixing member. The support frame can be made of a quadrangular frame mixed with a glass fiber mixed in synthetic resin such as polycarbonate, made of plastic, etc., or made of stainless steel. Meanwhile, a buffer member can be located between the lower substrate and the support frame. Therefore, the lower substrate of the display panel 100 can be protected from an impact by the support frame.

The top cover 420 can surround an edge of the display panel 100, an upper surface and side surfaces of the support frame, and side surfaces of the bottom cover 410. However, sizes of the top cover and the bottom cover can be changed in various ways.

In addition, the top cover 420 can be made of electronic galvanized iron (EGI), stainless steel or the like. The top cover 420 can be fixed to the support frame with hooks or screws. In addition, a buffer member can be located between the upper substrate and the top cover. Therefore, the upper substrate of the display panel 100 can be protected from an impact by the top cover 420.

Figure 3:
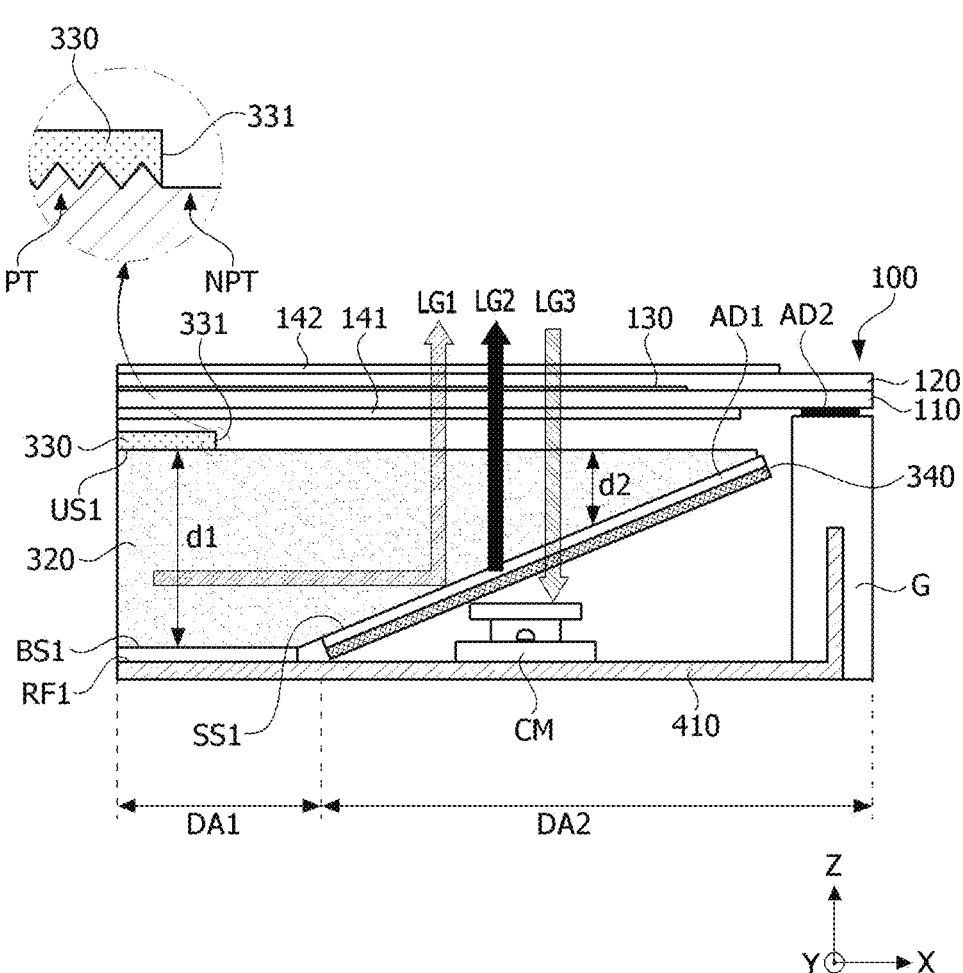
FIG. 3 is a cross-sectional view of a display device according to a first embodiment of the present disclosure.
Figure 4:
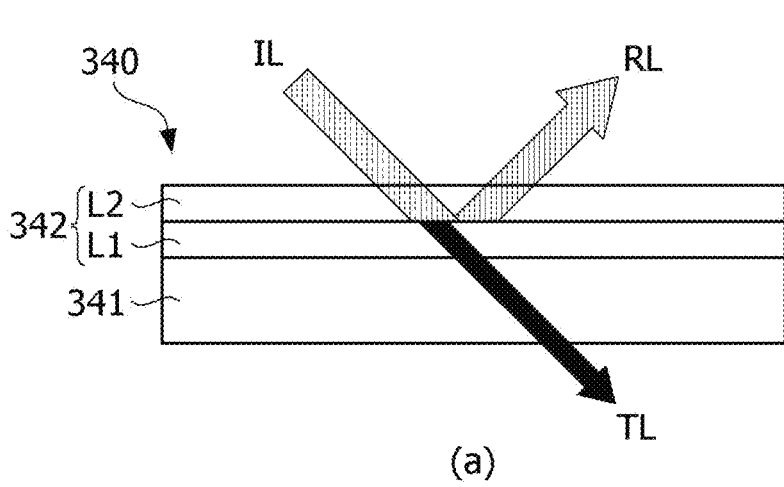
FIG. 4 is a view for describing a cross-section and a function of a reflector in the display device according to the embodiment of the present disclosure.
Figure 4:
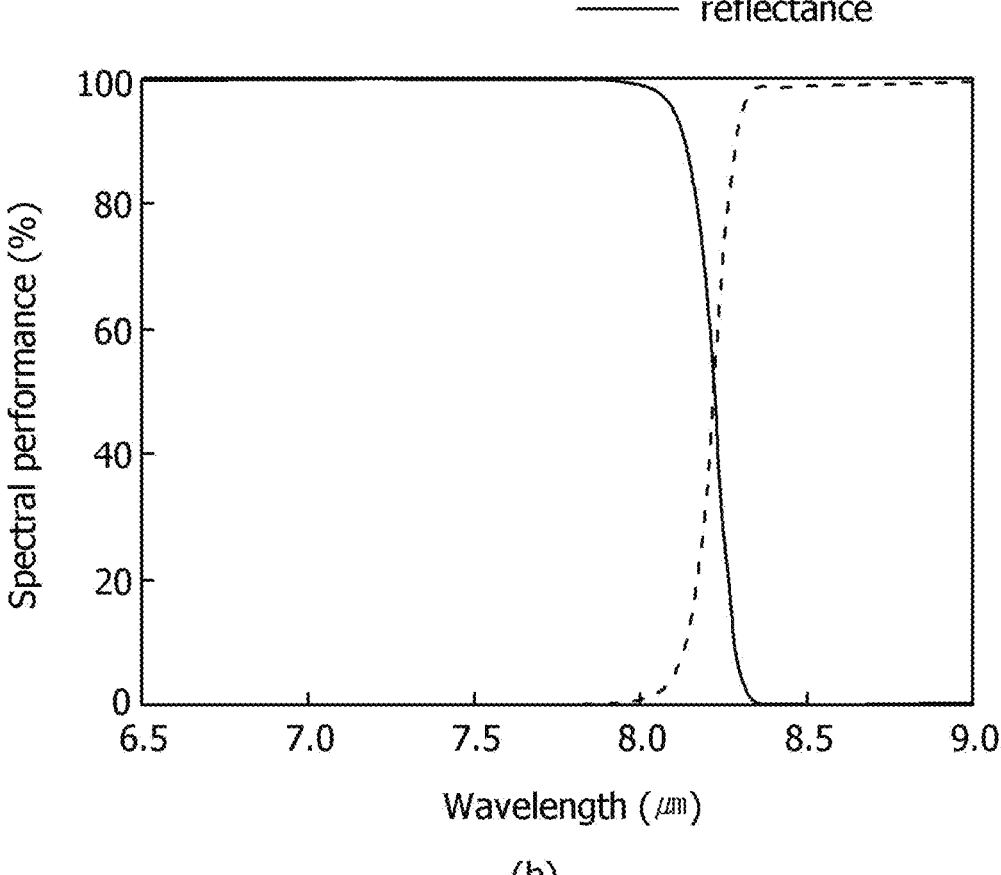
Figure 5:
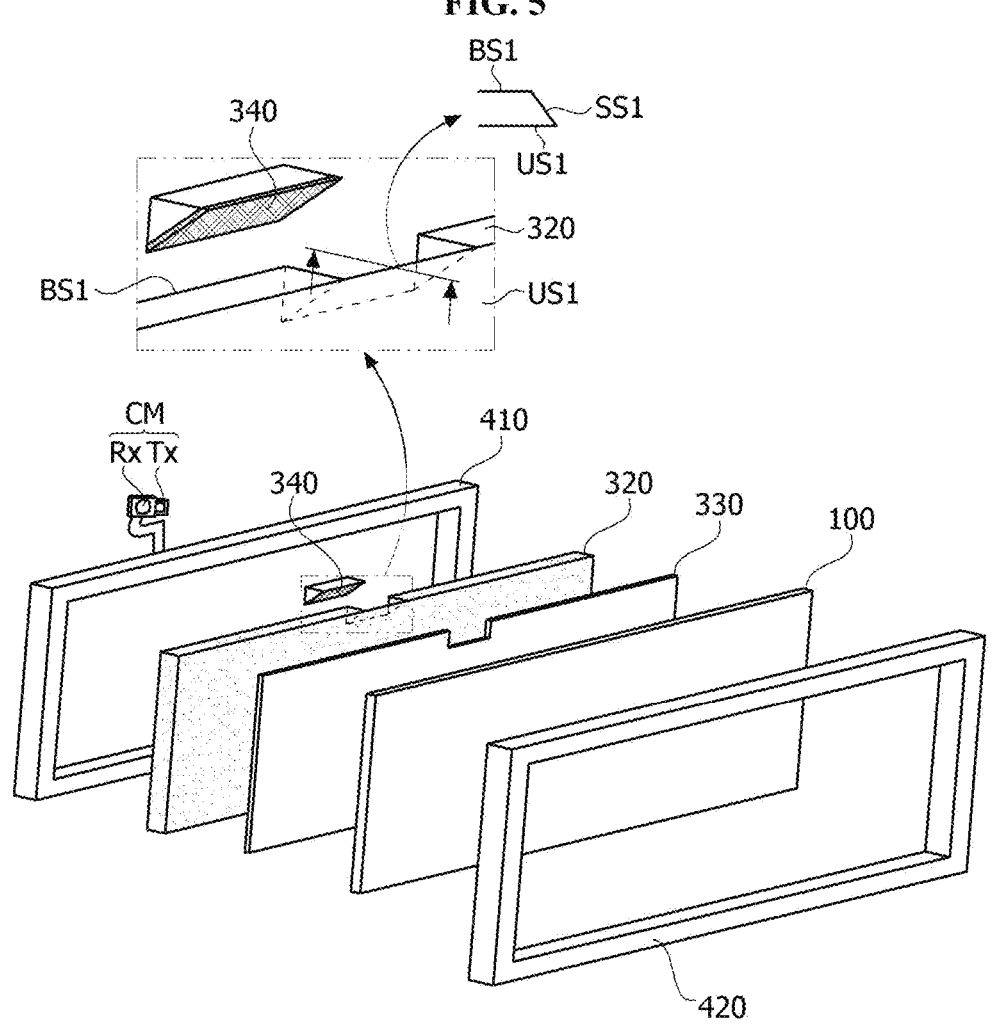
FIG. 5 is a view showing a light guide plate in the display device according to the first embodiment.
Figure 6:
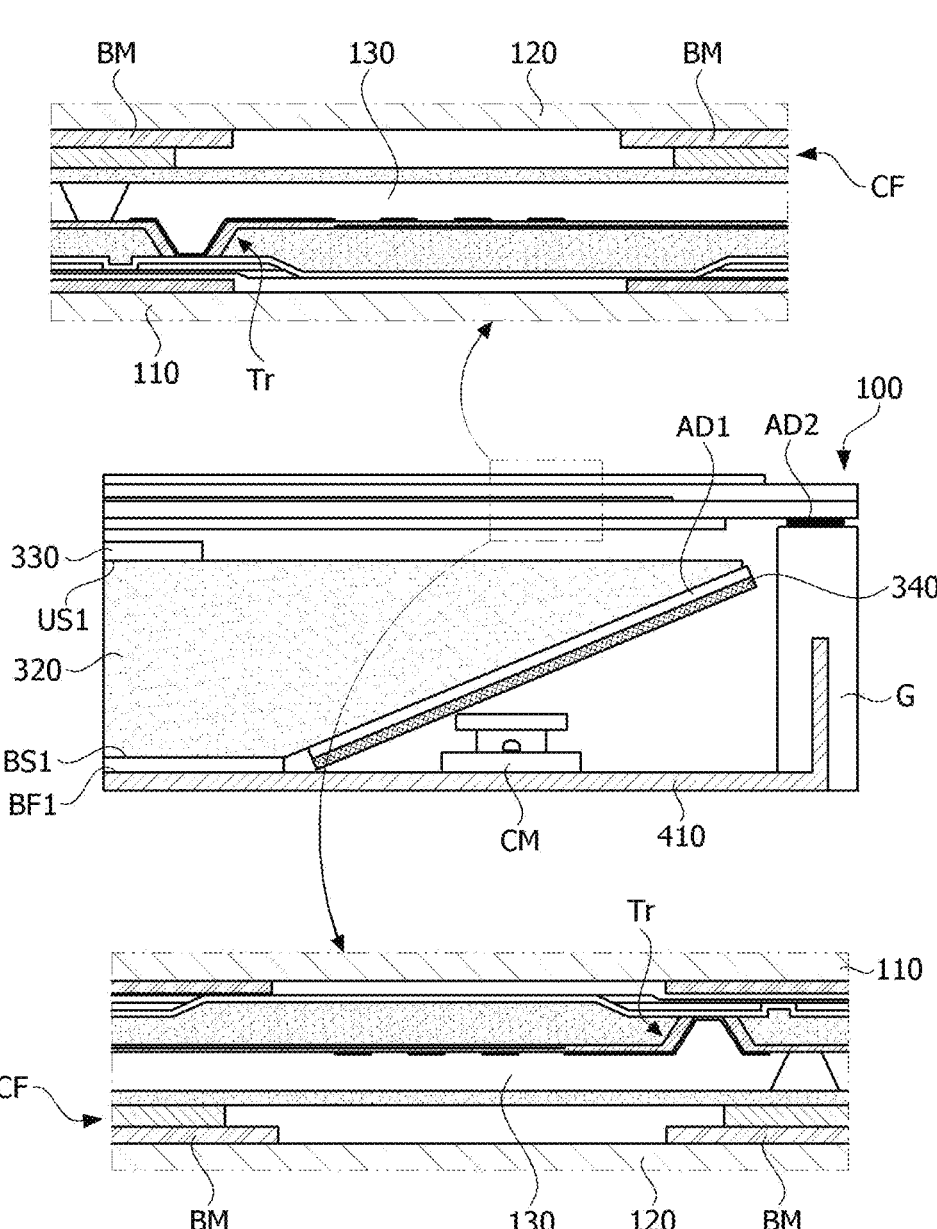
FIG. 6 is a cross-sectional view of a panel in the display device according to the first embodiment.

FIG. 3 is a cross-sectional view of a display device according to a first embodiment of the present disclosure, FIG. 4 is a view for describing a cross-section and a function of a reflector in the display device according to the embodiment of the present disclosure, FIG. 5 is a view showing a light guide plate in the display device according to the first embodiment, and FIG. 6 is a cross-sectional view of a panel in the display device according to the first embodiment.

Referring to FIG. 3 and FIG. 5, as described above, the light guide plate 320 can include an upper surface US1, a lower surface BS1, and a sloped surface SS1. The upper surface US1 and the lower surface BS1 can be flat surfaces and can be surfaces facing each other in a stacking direction.

In the light guide plate 320, the upper surface US1 and the lower surface BS1 can be spaced apart from each other and can be connected by side surfaces and the sloped surface SS1. The sloped surface SS1 can be located in a partial area of the light guide plate 320. In addition, the sloped surface SS1 can be located inside the light guide plate 320 or at the edge of the light guide plate 320 and can be located between the upper surface US1 and the lower surface BS1 or outside the upper surface US1 or the lower surface BS1 of the light guide plate 320.

The sloped surface SS1 can be a surface sloped at a predetermined angle with respect to the upper surface US1 and the lower surface BS1. The sloped surface SS1 can be located on the light guide plate 320, particularly on an opposing light portion or opposing incident light portion that opposes to an incident light portion facing the light source 310. Therefore, the dark area phenomenon generated by the sensor CM can be easily improved by reflecting visible light emitted to the opposing light portion.

In addition, corresponding to the location of the sloped surface SS1, the reflector 340 can be located to face the light source disposed at one side of the light guide plate 320. For example, the reflector 340 can be disposed at the other side of the light guide plate 320. In the embodiments of the present disclosure, one side of the light guide plate 320 can correspond to the incident light portion adjacent to the light source, and the other side of the light guide plate 320 can correspond to the opposing light portion or opposing incident light portion that opposes the light incident portion. In other words, the reflector 340 can also be located closer to the opposing light portion or the opposing incident light portion than the incident light portion. By a first adhesive member AD1, the reflector 340 can be bonded to the sloped surface SS1.

The optical sheet 330 can be located on the upper surface of the light guide plate 320. The optical sheet 330 may not be located in an area of the upper surface US1 that overlaps the sensor CM. Therefore, the luminance of the light reflected through the reflector 340 can be maintained high.

The lower surface BS1 of the light guide plate 320 can be located adjacent to the bottom cover 410. The lower surface BS1 of the light guide plate 320 can be located closer to the bottom cover 410 than the upper surface US1 is. In addition, a first reflective sheet RF1 can be disposed on the lower surface BS1 of the light guide plate 320. The first reflective sheet RF1 can reflect light directed downward from the light guide plate 320 in the light guide plate 320.

The first reflective sheet RF1 may not overlap the sloped surface SS1. For example, the first reflective sheet RF1 can be disposed to be misaligned with the sloped surface SS1 in the stacking direction. The first reflective sheet RF1 can be disposed to be spaced apart from the sensor CM. The first reflective sheet RF1 can correspond to the above-described "reflective sheet".

The sloped surface SS1 can be connected to the upper surface US1 and the lower surface BS1. For example, the sloped surface SS1 can be located between the upper surface US1 and the lower surface BS1. In addition, the sloped surface SS1 can be formed on the chamfered portion CH1 of the light guide plate 320.

The sloped surface SS1 can be misaligned with the lower surface BS1 in the stacking direction. In other words, the sloped surface SS1 may not overlap the lower surface BS1 in the stacking direction. In addition, a width W of the light guide plate 320 can increase in the stacking direction (or a first direction) on the sloped surface SS1 due to the sloped surface SS1.

For example, one end portion of the upper surface US1 can come into contact with one end portion of the sloped surface SS1, and one end portion of the lower surface BS1 can come into contact with the other end portion of the sloped surface SS1. In this case, a thickness d2 of the light guide plate 320 can decrease from the other end portion to the one end portion of the sloped surface SS1. The upper surface US1 and the lower surface BS1 of the light guide plate 320 can be flat except for the sloped surface SS1, but this is not necessarily limited thereto. The thickness d2 of the light guide plate 320 at the sloped surface SS1 can be less than or equal to a thickness d1 of the light guide plate 320 in an area other than the sloped surface SS1.

The reflector 340 can be located on the sloped surface SS1 to reflect the light guided along the light guide plate 320 to the second display area DA2. In other words, the reflector 340 can be configured to reflect the light output from the light source to the display panel 100. With this configuration, the dark area phenomenon generated in the second display area can be improved due to the sensor CM being located under the display panel 100.

The reflector 340 can transmit light (e.g., infrared ray) emitted from a transmitting unit of the sensor CM. Therefore, sensing through the sensor CM can be smoothly performed.

The reflector 340 can be referred to as a "filter" or a "a reflecting member". The reflector 340 can be formed of a material and a structure that reflects light in a visible wavelength band and transmits light in an infrared wavelength band. For example, the reflector 340 can be a dichroic filter, but is not necessarily limited thereto and various filters can be applied.

In addition, the sloped surface SS1 can have various optical patterns for diffusion. Therefore, light reflected from the reflector 340 provided on the sloped surface SS1 can be diffused toward the display panel 100. Therefore, the dark area in the second display area can be improved, and occurrence of a bright line, etc. due to the reflected light can be suppressed. For example, light uniformity can be improved.

Referring to FIG. 4, the reflector 340 can include a light transmitting substrate 341 and a plurality of layers 342. For example, the light transmitting substrate 341 can be formed of a light transmitting material such as glass.

The plurality of layers 342 can be located on the light transmitting substrate 341. For example, the plurality of layers 342 can include a first layer L1 and a second layer L2. The first layer L1 can be located between the second layer L2 and the light transmitting substrate 341.

The first layer L1 and the second layer L2 can be formed of materials with different refractive indices. For example, the first layer L1 can have a high refractive index characteristic compared to the second layer L2. In addition, the second layer L2 can have a low refractive index characteristic compared to the first layer L1. For example, the first layer L1 can be a high refractive index layer, and the second layer L2 can be a low refractive index layer.

In this case, the first layer L1 and the second layer L2 can have predetermined refractive indices according to desired wavelengths of light for transmittance and reflection. In addition, each of the first layer L1 and the second layer L2 can be formed of multiple layers rather than a single layer, and the multiple first layers L1 and the multiple second layers L2 can be alternately stacked. With this configuration, the reflector 340 can reflect light LG1 in the visible wavelength band and transmit light LG2 and LG3 in the infrared wavelength band. Therefore, the light LG3 reflected from an object among the light LG2 emitted from the transmitting unit of the sensor CM can be provided to the receiving unit. For example, the reflected light RL with respect to the incident light IL in the entire wavelength band can be light in the visible wavelength band. In addition, transmitted light TL can be light in the infrared wavelength band.

According to the embodiment, the sensor CM can be located under the reflector 340, and light from the backlight can be emitted through the reflector 340, thereby reducing the dark area around the sensor. In addition, a thin bezel can be manufactured.

The light guide plate 320 can include a patterned area PT and a non-patterned area NPT. For example, the upper surface US1 of the light guide plate 320 can be divided into the patterned area PT and the non-patterned area NPT. In addition, the optical sheet 330 can overlap the patterned area PT in the stacking direction.

In the embodiment, the patterned area PT can have a predetermined optical pattern (e.g., dots, a prism structure, a concave-convex structure, etc.). The optical pattern can be manufactured in a printed form, a non-printed from (an unprinted form), etc. The optical pattern can have various shapes. In addition, light can be diffused upward the light guide plate 320 by the optical pattern, thereby providing uniform light to the panel. The patterned area PT can overlap the first display area DA1 in the stacking direction.

Alternatively, the non-patterned area NPT can overlap the second display area (DA2) in the stacking direction. In addition, the non-patterned area NPT can overlap the sloped surface SS1 in the stacking direction. In addition, at least a portion of the optical sheet 330 may not overlap the non-patterned area NPT in the stacking direction. In other words, at least a portion of the optical sheet 330 can be misaligned with the non-patterned area NPT in the stacking direction. For example, a portion of the non-patterned area NPT can overlap the first display area. In this way, the non-patterned area NPT can vary corresponding to the field of view of the sensor CM. In the embodiment, the optical sheet 330 can have the opening 331 to increase the luminance of the light emitted to the second display area DA2.

In addition, when the portion of the non-patterned area NPT overlaps the first display area, the portion of the non-patterned area NPT can overlap the first reflective sheet RF1 in the stacking direction. In addition, the portion of the non-patterned area NPT can also overlap the lower surface BS1 of the light guide plate 320 in the stacking direction.

As described above, the optical sheet 330 can overlap not only the patterned area PT but also the non-patterned area NPT in the stacking direction. For example, the non-patterned area NPT can include a smaller ratio of the optical pattern or a lower height of the optical pattern than the patterned area PT. With this configuration, the effect of reducing dark areas through visible light reflected from the reflector can be improved. In addition, sensing performance of the sensor CM using infrared light can be maintained.

The support frame G can be disposed at an end portion of the light guide plate 320. The support frame G can surround the light guide plate 320, etc. as described above. In addition, the support frame G can be coupled to the bottom cover 410 (or the top cover) by a fixing member. Alternatively, the support frame G can be coupled to the bottom cover 410 by various coupling structures (e.g., penetration structures, etc.). For example, the bottom cover 410 can be passed through at least a partial area of the support frame G.

In addition, in the embodiment, a second adhesive member AD2 can be located between the support frame G and the display panel 100. In particular, the second adhesive member AD2 can overlap the non-display area of the display panel 100. The second adhesive member AD2 can have a form of a tape, etc.

Referring to FIG. 6, as described above, the display panel 100 can include the upper substrate 120, the lower substrate 110, and the liquid crystal layer 130 disposed between the upper substrate 120 and the lower substrate 110.

In addition, signal lines and pixels can be provided on the upper surface of the lower substrate 110 of the display panel 100. As described above, the signal line can include a data line and a gate line that intersect each other, a common line etc. that supply a common voltage. In addition, each of the pixels can include a transistor Tr.

A liquid crystal in the liquid crystal layer 130 can be driven by an electric field generated by a potential difference between the data voltage supplied to the pixel electrode and the common voltage supplied to the common electrode. The transmission amount of the light incident from the backlight unit 300 can be adjusted by driving of the liquid crystal. In addition, a black matrix BM and a color filter CF can be disposed on the lower surface of the upper substrate 120 of the display panel 100.

In addition, as another example, when the display panel 100 is formed in a color filter on TFT array (COT) method, the black matrix BM and color filter can be disposed above the backlight. For example, the color filter substrate on which the color filter CF and black matrix BM are disposed can be disposed on the backlight unit, and the liquid crystal layer and TFT substrate can be disposed over the color filter CF and black matrix BM. In this way, process yield can be improved by changing the location of the black matrix, etc., or light leakage can be suppressed in the non-display area, the second display area, and the like. As a result, uniform luminance through the reflector, etc. can be more easily formed.

Figures 7, 8:
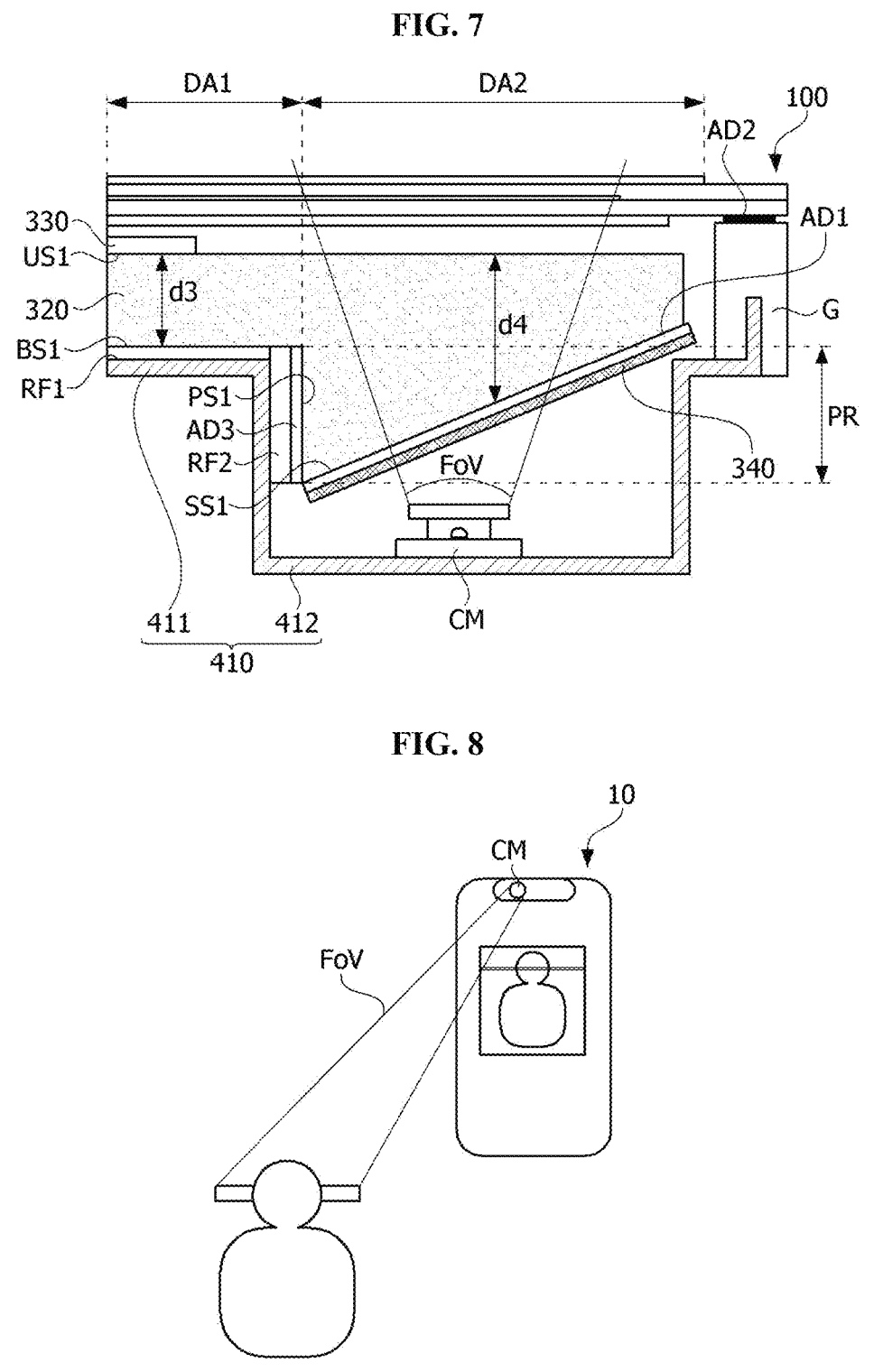

FIG. 7 is a modified example of FIG. 3.

Referring to FIG. 7, the display device can include the display panel 100, the backlight unit 300, the sensor CM, and a case member. In addition, except for the contents described below, the contents described in other embodiments, etc. can be applied to the present embodiment.

The bottom cover 410 can include a base portion 411 and a protruding portion 412. The protruding portion 412 can be located in one area of the bottom cover 410 and can be a portion extending downward from the base portion 411. For example, the sensor CM can be accommodated in the protruding portion 412. Therefore, accommodation space for the sensor CM can be easily secured.

The protruding portion 412 can be located at the edge of the base portion 411 or inside the base portion 411. The protruding portion 412 can be surrounded by the base portion 411. For example, the protruding portion 412 can be located inside the edge of the base portion 411. A location of the protruding portion 412 can be variously adjusted corresponding to a location of the sensor CM.

Corresponding to the protruding portion 412, the light guide plate 320 can have a protruding region PR extending downward. Therefore, a thickness d4 or the maximum thickness of the light guide plate 320 at the sloped surface SS1 can be greater than a thickness d3 of the light guide plate 320 at the lower surface BS1 (or in the first display area).

Under the second display area DA2, the sloped surface SS1 can be located in the protruding region PR. Therefore, at least a portion of the sloped surface SS1 can be located under the light guide plate 320. With this configuration, the light guide plate 320 can be easily supported and coupled to the bottom cover 410. In addition, since the thickness d3 of the light guide plate 320 can be formed small under the first display area, miniaturization of the display device can be easily achieved.

In addition, even when an incidence area of the reflector 340 according to the field of view of the sensor CM increases, a thickness in the entirety of the light guide plate 320 may not increase through the protruding region PR. For example, since the light guide plate 320 has the protruding region PR in a partial area, weight lightening and miniaturization can be maintained even when a sloped angle of the reflector 340 changes.

The protruding region PR can include an extending surface PS1 extending downward from the lower surface BS1 of the light guide plate 320. A second reflective sheet RF2 can be disposed between the protruding surface PS1 and an inner surface of the protruding portion 412 facing the protruding surface PS1.

The second reflective sheet RF2 can be located on the protruding surface PS1. The second reflective sheet RF2 can overlap the reflector 340 in a horizontal direction (a direction from the light source toward the light guide plate). In addition, the second reflective sheet RF2 can have a smaller length in the stacking direction than the reflector 340. Therefore, light reflected from the reflector 340 or directed downward through the light guide plate 320 can be reflected to the inside of the light guide plate 320 as much as possible.

For example, the second reflective sheet RF2 can be formed of a structure and material that induces diffused reflection. In addition, bead coating can be applied to the second reflective sheet RF2. In this way, the second reflective sheet RF2 can increase the amount of light irradiated to the display panel 100. Therefore, the reduction in the dark area can be more effectively implemented.

The protruding region PR can be a member separated from the light guide plate 320. Therefore, in order to couple the protruding region PR to the light guide plate 320, an additional adhesive member can be located between the protruding region PR and the light guide plate 320. In addition, the adhesive member and the reflective sheet outside the adhesive member can be further disposed on surfaces other than the sloped surface SS1 of the protruding region PR.

On the upper surface of the light guide plate 320 disposed in the second display area DA2, the optical pattern can be absent or the optical pattern whose size is smaller than that a size of the optical pattern formed in the first display area DA1 can be formed. In addition, an additional adhesive member or optical member can be further applied to have a flat surface.

A third adhesive member AD3 can be located between the second reflective sheet RF2 and the extending surface PS1. The first adhesive member AD1 and the third adhesive member AD3 can be formed of optical adhesive films. For example, the first adhesive member AD1 and the third adhesive member AD3 can be formed of light-transmissive materials. In addition, the first adhesive member AD1 and the third adhesive member AD3 can be formed of a material providing a predetermined haze level (opacity level due to light diffusion). Therefore, light uniformity can be easily adjusted.

Figure 9:
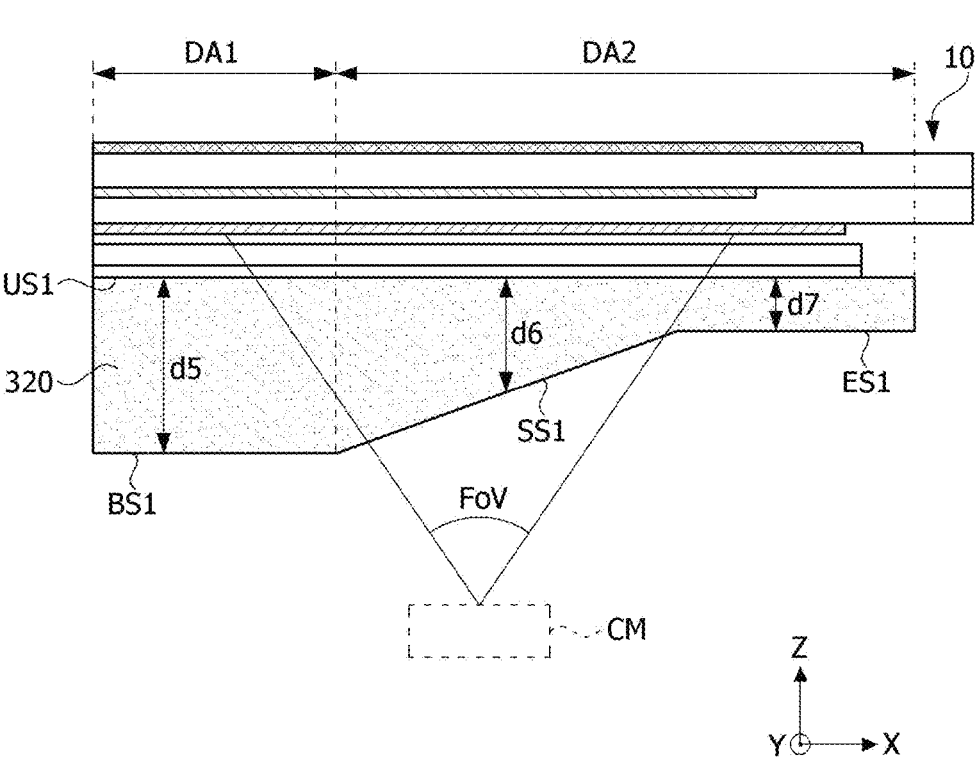
FIG. 9 shows another structure of a light guide plate in the display device according to the embodiment.
Figure 10:
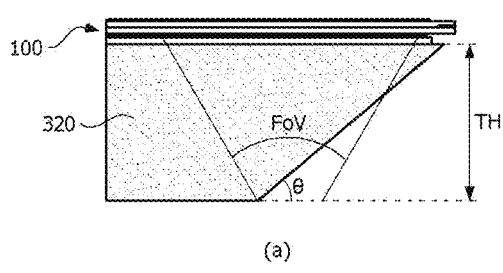
FIGS. 10 and 11 are views for describing a thickness change of the light guide plate according to a field of view and a structure of the light guide plate in the display device.
Figure 10:
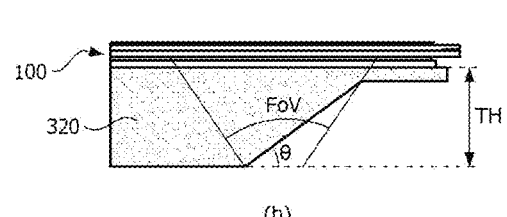
Figure 10:
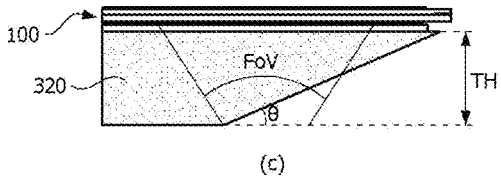
Figure 10:
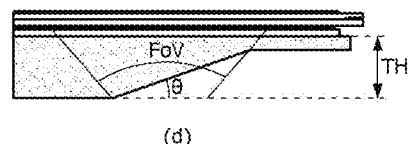
Figure 11:
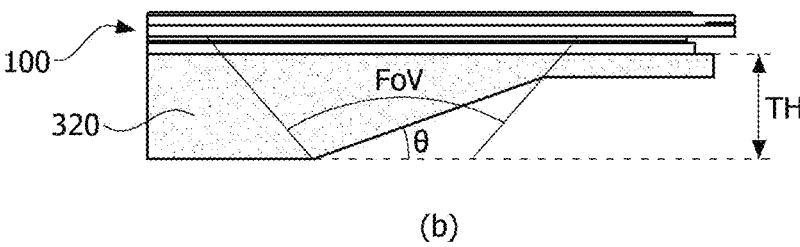

FIG. 8 is a view for describing a function of a sensor in a display device according to the embodiment, FIG. 9 is another structure of a light guide plate in the display device according to the embodiment, and FIGS. 10 and 11 are views for describing a thickness change of the light guide plate according to a field of view and a structure of the light guide plate in the display device.

Referring to FIG. 8, the sensor CM in the display device 10 of an electronic device can have a predetermined field of view (FOV). In one embodiment, the field of view of the sensor CM can be between 30 degrees and 60 degrees. For example, the field of view of the sensor CM can be 53 degrees. Corresponding to the field of view of the sensor CM, a thickness of the light guide plate can change according to a sloped angle of the reflector.

Referring to FIG. 9, the light guide plate 320 can have an extending portion extending from the sloped surface SS1. Corresponding to this extending portion, the light guide plate 320 can include a flat surface ES1 extending from the sloped surface SS1 to the other side thereof. The flat surface ES1 can be a flat surface such as the upper surface US1 or the lower surface BS1. Therefore, the light guide plate 320 can have a stepped structure inclined toward the other side thereof. According to this configuration, an overall thickness of the light guide plate 320 can be reduced, thereby providing miniaturization and ease of manufacturing of the light guide plate. However, the present disclosure is not necessarily limited thereto, and the flat surface ES1 can have an inclined structure like the sloped surface SS1. In this case, the flat surface ES1 can be disposed to be inclined at an angle smaller than the sloped angle of the sloped surface SS1.

The flat surface ES1 can be disposed under the second display area DA2. At least a portion of the flat surface ES1 can overlap the second display area DA2 in the stacking direction.

More specifically, in the light guide plate 320, the sloped surface SS1 can be located between the lower surface BS1 and the flat surface ES1. In addition, in the light guide plate 320, the upper surface US1 can be a surface facing the lower surface BS1, the sloped surface SS1, and the flat surface ES1.

The light guide plate 320 can have an area where a thickness thereof decreases from one side where the light source is disposed toward the other side. A thickness d5 of the light guide plate 320 on the lower surface BS1 can be greater than a thickness d6 of the light guide plate 320 on the sloped surface SS1. The thickness d6 of the light guide plate 320 on the sloped surface SS1 can gradually decrease in a first direction (e.g., an X-axis direction). In addition, a thickness d7 of the light guide plate 320 on the flat surface ES1 can be constant in the first direction (the X-axis direction).

The thickness d7 of the light guide plate 320 on the flat surface ES1 can be formed to be smaller than or equal to the thickness d6 of the light guide plate 320 on the sloped surface SS1. For example, the thickness d7 of the light guide plate 320 on the flat surface ES1 can be smaller than the thickness d5 of the light guide plate 320 on the lower surface BS1.

As in the present example, when the light guide plate 320 extends to the other side thereof, the light guide plate 320 can have the flat surface being flat outside the sloped surface. Therefore, the light guide plate 320 can have the flat surface being flat rather than the sloped surface in an area outside the field of view or viewing angle of the sensor. Therefore, a more compact light guide plate can be provided. For example, when an angle (an acute angle) between the sloped surface and the flat surface of the lower surface keeps the same, the maximum thickness (e.g., d5) of the light guide plate 320 can be relatively reduced by having the flat surface compared to the case having only the sloped surface.

TABLE 1

| Sloped Angle | 45° | 30° | 20° |
|---|---|---|---|
| Thickness of light guide plate having flat surface | 5.5 mm ((b) of FIG. 10) | 3 mm ((d) of FIG. 10 and (a) of FIG. 11) | 2 mm ((b) of FIG. 11) |
| Thickness of light guide plate without flat surface | 10 mm ((a) of FIG. 10) | 5 mm ((c) of FIG. 10) | — |

Table 1 shows the thickness of the light guide plate according to each sloped angle θ and the presence or absence of the flat surface in FIGS. 10 and 11. Here, the sloped angle θ of the reflector for the light emitted from the sensor can be the same as the angle (the acute angle) between the sloped surface and the flat surface of the lower surface. In addition, a size (e.g., a width) of the sensor CM can be 3.5 mm. The size (or the width) of the sensor CM can correspond to a length in a direction (or a direction from the light source to the light guide plate) from one side to the other side of the light guide plate. In addition, the field of view (FOV) can be 53.13°, and the thickness of the light guide plate on the flat surface can be 0.6 mm. Referring to FIG. 10 and Table 1, it can be seen that the thickness of the light guide plate 320 is reduced because the light guide plate has the flat surface being flat (or the extending portion) when the sloped angle θ is the same. For example, the thickness of the light guide plate can be reduced by forming a range outside the field of view (FOV) flat.

For example, when comparing (a) of FIG. 10 and (b) of FIG. 10, which have the same sloped angle θ, it can be seen that the thickness TH of the light guide plate decreases from 10 mm to 5.5 mm. In addition, when comparing (c) of FIG. 10 and (d) of FIG. 10, which have the same sloped angle θ, it can be seen that the thickness TH of the light guide plate decreases from 5 mm to 3 mm.

In addition, in the case of having the same structure, it can be seen that as the sloped angle θ increases, the thickness of the light guide plate increases. For example, when comparing (a) of FIG. 10 and (c) of FIG. 10, it can be seen that as the sloped angle θ increases, the thickness of the light guide plate increases.

Table 2 shows the transmittance (%) for lights in visible wavelength (550 nm) and infrared wavelength (940 nm) according to an incident angle when the reflector is a dichroic filter. Here, the incident angle is an angle at which light is incident on the dichroic filter.

TABLE 2

| Wavelength\Incident Angle (°) | 0 | 20 | 45 | 70 |
|---|---|---|---|---|
| 550 nm | 0.03% | 0.09% | 0.05% | 0.37% |
| 940 nm | 97.2% | 91.4% | 75.1% | 48.7% |

As shown in Table 2, it can be seen that even when the incident angle increases, the transmittance for light in the visible wavelength band remains less than 1%. For example, reflectance of the reflector for the light in the visible light wavelength band can be less affected by the incident angle. Alternatively, the transmittance for light in the infrared wavelength band can be greatly affected by an increase in the incident angle. In particular, it can be seen that as the incident angle increases, the transmittance for the light in the infrared wavelength decreases. Therefore, it can be seen that by having a small incident angle and having the extending portion (or the flat surface), it is possible to provide the display device that is more compact with improved sensing sensitivity through high infrared light transmittance.

Figure 12:
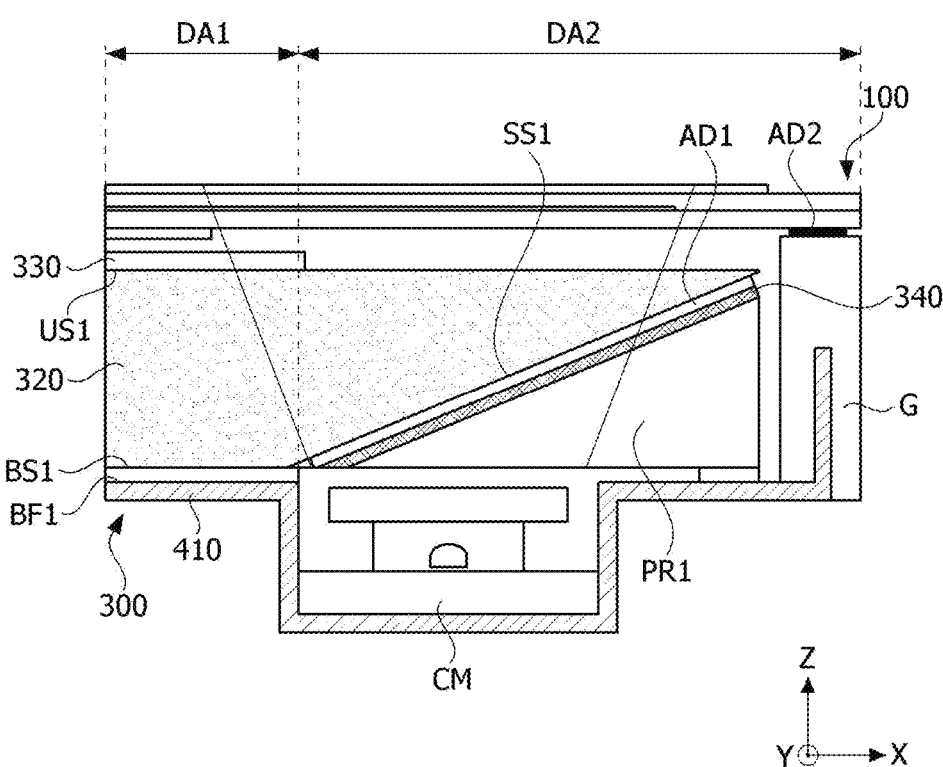
FIG. 12 is a cross-sectional view of a display device according to a second embodiment of the present disclosure.
Figure 13:
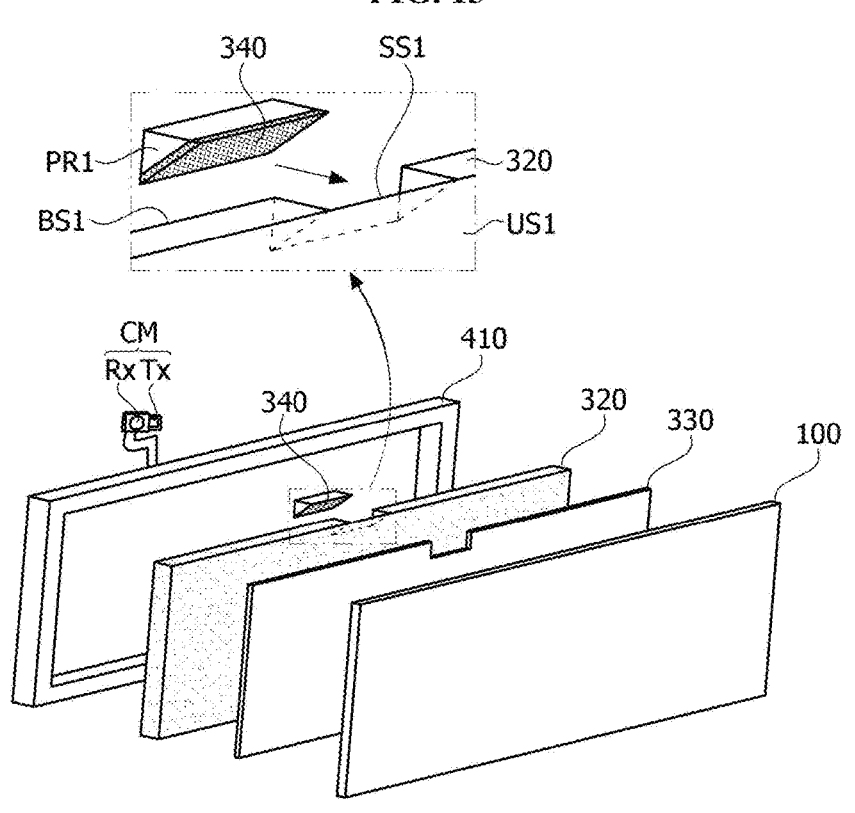
FIG. 13 is a view showing a light guide plate, a reflector, and a first prism in the display device according to the second embodiment.

FIG. 12 is a cross-sectional view of a display device according to a second embodiment of the present disclosure, and FIG. 13 is a view showing a light guide plate, a reflector, and a first prism in the display device according to the second embodiment.

Referring to FIGS. 12 and 13, a display device according to the second embodiment can include the display panel 100, the backlight unit 300, the sensor CM, and a case member. In addition, the backlight unit 300 can further include a first prism PR1. In addition, except for the contents described below, the contents described in other embodiments, etc. can be applied to the present embodiment.

In the present embodiment, the light guide plate 320 can have the sloped surface SS1 overlapping the second display area DA2. In addition, as described above, light emitted from a light source can be guided in the light guide plate 320 to reflect to the display panel 100 by the reflector 340 disposed at the other side of the light guide plate 320.

The first prism PR1 can be disposed under the sloped surface SS1. In addition, the first prism PR1 can overlap the sloped surface SS1 in the stacking direction. In addition, the first prism PR1 can be located at the other side of the light guide plate 320. For example, the first prism PR1 can be located between the light guide plate 320 and the support frame G. In addition, the first prism PR1 can be located between the reflector 340 and the sloped surface SS1.

The first prism PR1 can be emitted from the light source and can support the sloped surface SS1 of the light guide plate 320 and the reflector 340. For example, a sloped surface of the first prism PR1 can come into contact with the reflector 340. In addition, one surface (e.g., a lower surface) of the first prism PR1 can be supported by the bottom cover 410. Therefore, reliability of the light guide plate 320 can be improved. In addition, as the reflector 340 is surrounded by the first prism PR1, it is possible to suppress the introduction of foreign substances, etc. into the reflector 340 through which light in the infrared wavelength band is transmitted. Therefore, improved sensing sensitivity can be maintained.

Figure 14:
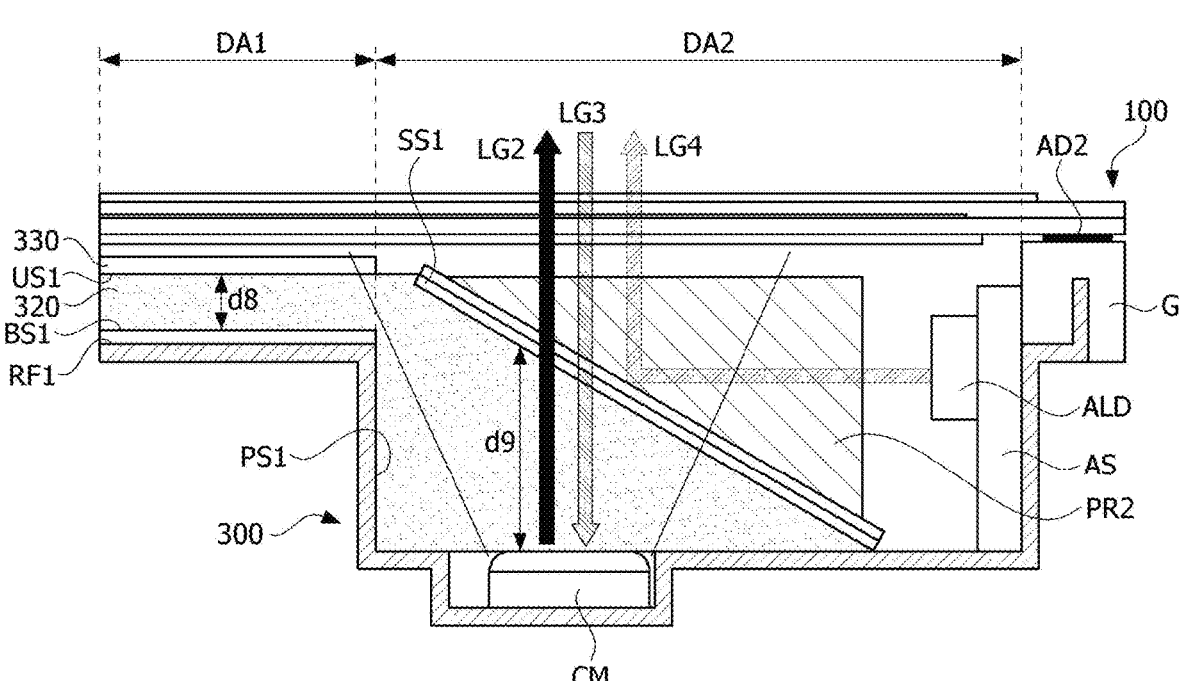
FIG. 14 is a cross-sectional view of a display device according to a third embodiment of the present disclosure.
Figure 15:
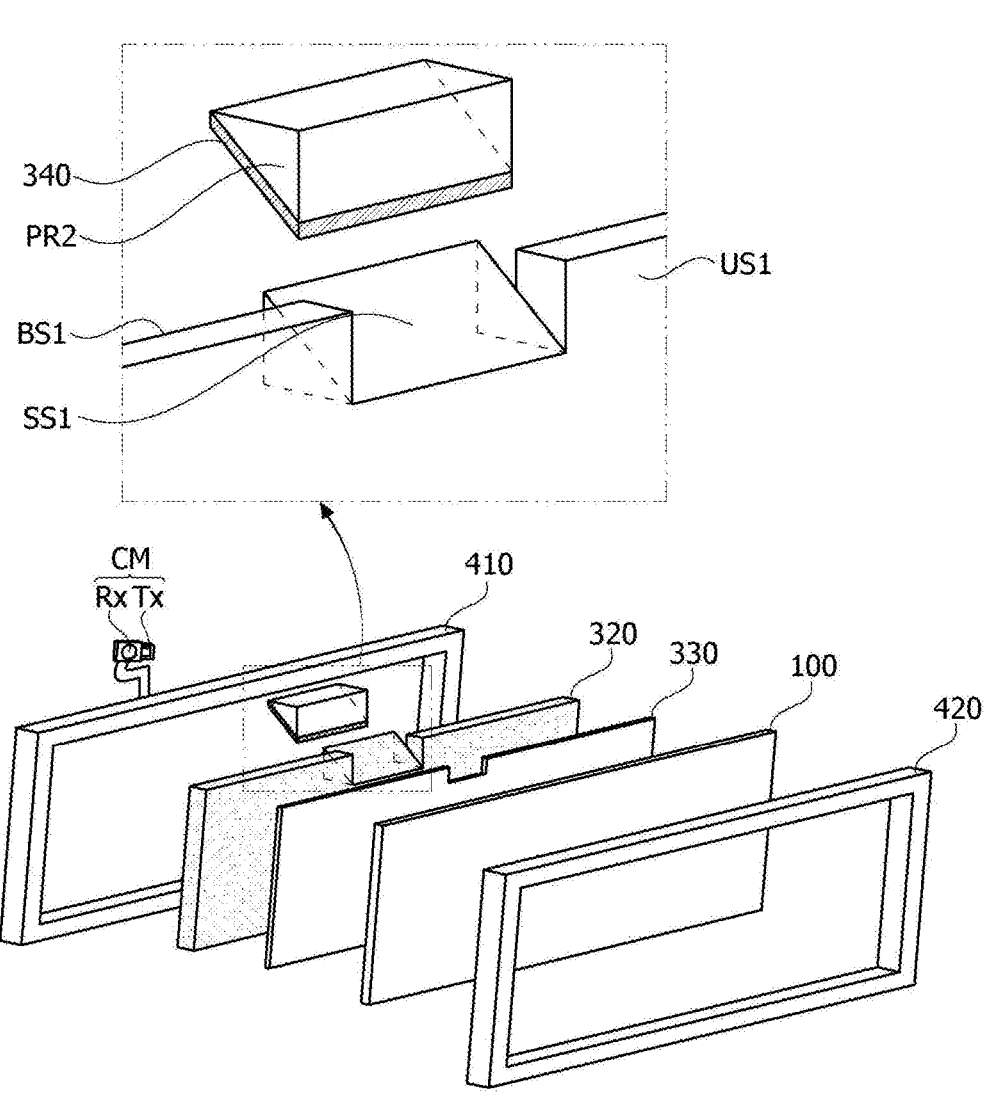
FIG. 15 is a view showing a light guide plate, a reflector, and a second prism in the display device according to the third embodiment.

FIG. 14 is a cross-sectional view of a display device according to a third embodiment of the present disclosure, and FIG. 15 is a view showing a light guide plate, a reflector, and a second prism in the display device according to the third embodiment.

Referring to FIGS. 14 and 15, a display device according to the third embodiment can include the display panel 100, the backlight unit 300, the sensor CM, and a case member. In addition, the display device or the backlight unit 300 can further include a second prism PR2, a light-emitting unit ALD, and a light-emitting unit substrate AS. In addition, except for the contents described below, the contents described in other embodiments, etc. can be applied to the present embodiment.

In the light guide plate 320 of the present embodiment, the sloped surface SS1 may not overlap the upper surface US1 in the stacking direction. In addition, as described above, the light guide plate 320 can have a protruding region extending downward. In addition, the sloped surface SS1 can be located in the protruding region. In addition, since a thickness d8 of the light guide plate 320 can be formed small under the first display area, miniaturization of the display device can be easily achieved. In addition, even when an incident area of the reflector 340 according to the field of view of the sensor CM increases, a thickness of the light guide plate 320 can be prevented from increasing through the protrusion region. In other words, it is possible to maintain light weight and miniaturization even when the sloped angle of the reflector 340 changes.

Corresponding to the protruding region PR, the light guide plate 320 can include the extending surface PS1 extending downward from the lower surface BS1 thereof. The thickness of the light guide plate 320 can be increased due to the extending surface PS1. For example, the thickness d8 of the light guide plate 320 on the lower surface BS1 can be smaller than a thickness d9 of the light guide plate 320 on the sloped surface SS1.

In addition, the distance between the sloped surface SS1 and the sensor CM in the stacking direction can decrease as the sloped surface SS1 moves toward the other side of the light guide plate 320. In addition, the width of the light guide plate 320 can decrease along the stacking direction (or first direction) at the sloped surface SS1. In addition, the thickness d9 of the light guide plate 320 under the sloped surface SS1 can decrease toward the other side of the light guide plate 320. For example, a thickness of the light guide plate 320 in an area closest to one side of the light guide plate 320 can be greater than a thickness of the light guide plate 320 in an area closest to the other side of the light guide plate 320. According to a sloped structure of the sloped surface SS1, the reflector 340 disposed on the sloped surface SS1 can reflect the light output from the light source to the sensor. As a modified example, the thickness of the light guide plate 320 on the lower surface BS1 can be the same as a thickness of the extending surface PS1.

In addition, the light-emitting unit ALD can perform the same function as the light source. For example, the light-emitting unit ALD can emit light of visible wavelength. In addition, the reflector 340 can reflect the light LG4 emitted from the light-emitting unit ALD upward or to the display panel 100. Therefore, the dark area generated in the second display area DA2 can be reduced. In addition, when the amount of light of the light-emitting unit ALD is controlled, occurrence of a bright line, etc. can be suppressed, or the light uniformity between the first display area and the second display area can be improved.

The light-emitting unit ALD can be located on the light-emitting unit substrate AS. The light-emitting unit substrate AS can be electrically connected to a circuit portion. There-fore, as described below, control signals of the light-emitting unit ALD can be applied to the light-emitting unit substrate AS depending on whether the sensor is driven (on/off).

The second prism PR2 can be located on the reflector 340. The second prism PR2 can be located between the reflector 340 and the light-emitting unit ALD. In addition, the second prism PR2 can be located between the sloped surface SS1 and the light-emitting unit ALD. The second prism PR2 can surround the reflector 340 above the reflector 340. There-fore, it is possible to suppress the introduction of foreign substances, etc. into the reflector 340 through which the light in the infrared wavelength band is transmitted and the light in visible wavelength is reflected. Therefore, improved sensing sensitivity can be maintained and the dark areas can be easily reduced.

Figure 16:
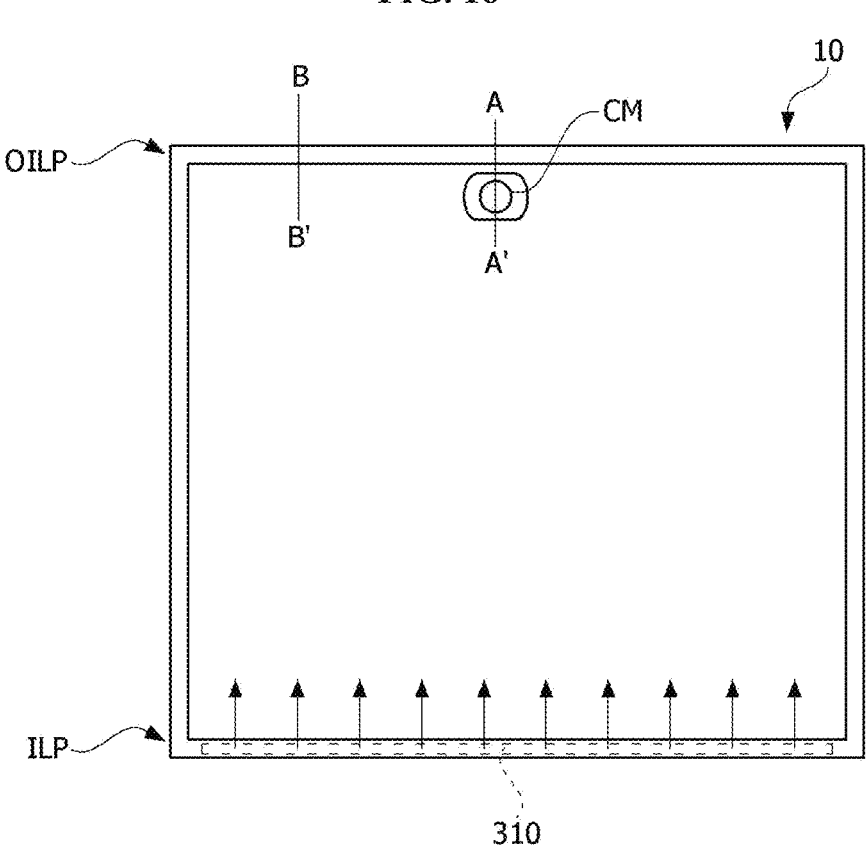
FIG. 16 is a plan view of a display device according to a modified example of the present disclosure.
Figure 17:
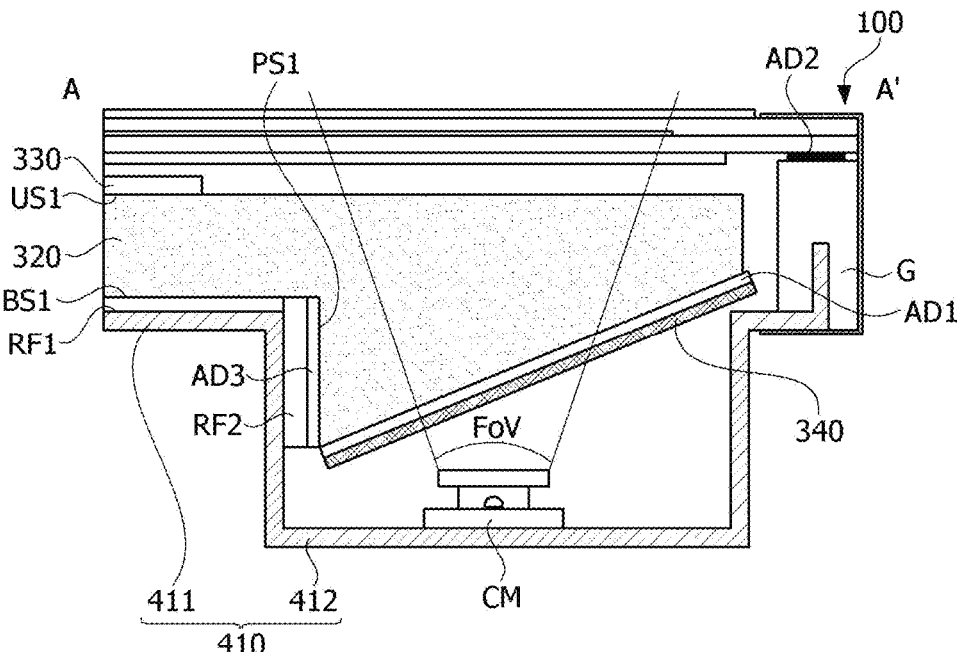
FIG. 17 is a cross sectional view along line A-A' in FIG. 16.
Figure 18:
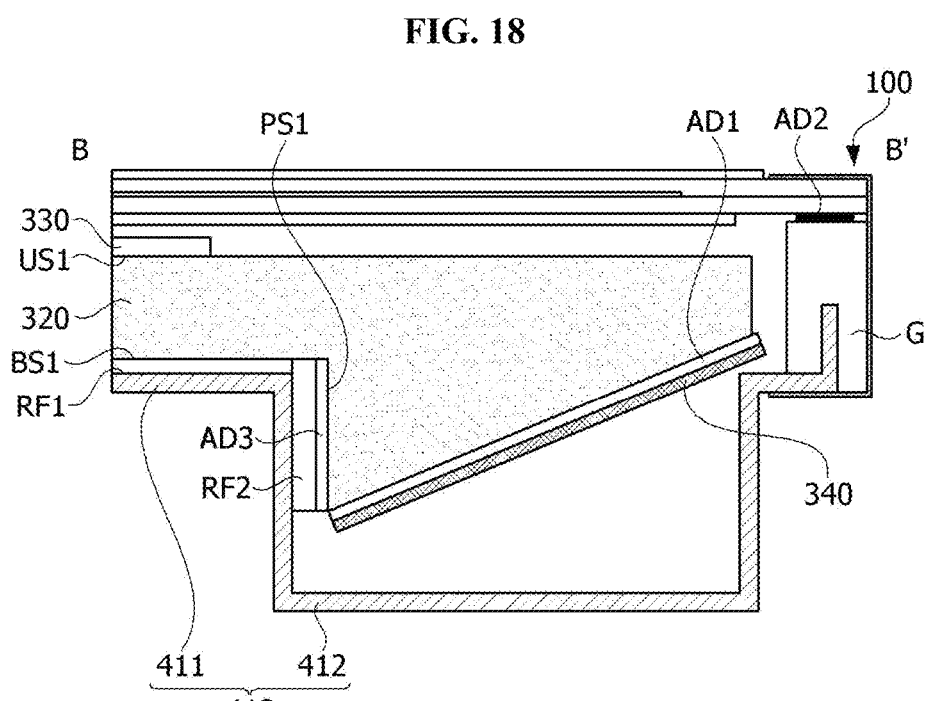
FIG. 18 is a cross sectional view along line B-B' in FIG. 16.
Figure 19:
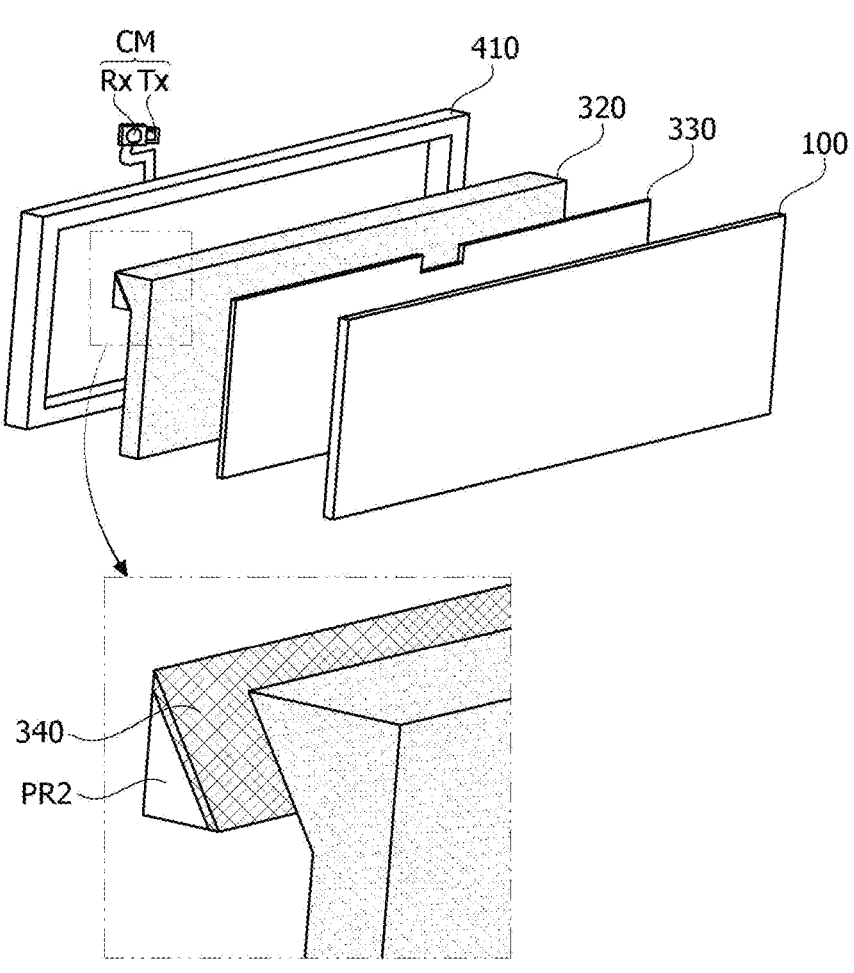
FIG. 19 is a view showing a light guide plate and a reflector in a display device according to a modified example of the present disclosure.

FIG. 16 is a plan view of a display device according to a modified example, FIG. 17 is a cross sectional view along line A-A' in FIG. 16, FIG. 18 is a cross sectional view along line B-B' in FIG. 16, and FIG. 19 is a view showing a light guide plate and a reflector in a display device according to a modified example.

Referring to FIG. 16, a display device can include the display panel 100, the backlight unit 300, the sensor CM, and a case member. Except for the contents described below, the contents described in other embodiments, etc. can be applied to the present embodiment. The display device 10 can be divided into an incident light portion ILP adjacent to the light source 310 and an opposing incident light portion OILP opposing the incident light portion ILP. Likewise, one side of the light guide plate adjacent to the light source 310 can correspond to the incident light portion, and the other side spaced far apart from the light source 310 can corre-spond to the opposing light portion or the opposing incident light portion. Therefore, the amount of light guided or incident to the opposing incident light portion is light not only above the sensor CM located on the other side of the light guide plate but also in an area adjacent to the sensor CM, and can be less than the amount of light in the incident light portion.

Referring to FIGS. 17 to 19, the display device according to the modified example can include the display panel 100, the backlight unit 300, the sensor CM, and a case member. In addition, except for the contents described below, the contents described in other embodiments, etc. can be applied to the present embodiment.

The sloped surface SS1 can overlap not only the second display area overlapping the sensor CM, but also an area overlapping the opposing incident light portion of the first display area. For example, the sloped surface SS1 can be located over the entire opposing incident light portion. For example, the sloped surface SS1 can be located in an area other than the area overlapping the sensor CM. In addition, the sloped surface SS1 can overlap an area overlapping the opposing incident light portion of the first display area and the second display area. In addition, the reflector 340 can be disposed on the sloped surface SS1 and can overlap the sloped surface SS1. Therefore, the reflector 340 can also be located over the entire opposing incident light portion. For example, the reflector 340 can also be located in an area other than the area overlapping the sensor CM. And the reflector 340 can overlap the area overlapping the opposing incident light portion of the first display area and the second display area. With this configuration, even when the amount of light guided to the opposing incident light portion is small, light can be reflected to the display panel 100 by the reflector 340. Therefore, luminance can be uniform through the entirety of the display panel.

In addition, in order to increase the amount of light provided to the display panel 100, a third adhesive member AD3 and a second reflective sheet RF2 can be disposed on the extending surface of the protruding region of the light guide plate 320. The third adhesive member AD3 and the second reflective sheet RF2 can be located in the area overlapping the opposing incident light portion as described above. The second reflective sheet RF2 can be formed of a structure and material that induces diffused reflection. In addition, bead coating can be applied to the second reflective sheet RF2. In addition, the third adhesive member AD3 can be formed of a material providing a predetermined haze level (opacity level due to light diffusion). In addition, at least one of the extending surface and the sloped surface can have various optical patterns for diffusion. Therefore, even when the amount of light guided not only to the second display area but also to the opposing incident light portion is small, the amount of light output to the display panel 100 overlapping the opposing incident light portion can be increased. Therefore, since the reduction in the dark area can be effectively implemented, and luminance can be uniform through the entirety of the display panel.

Figure 20:
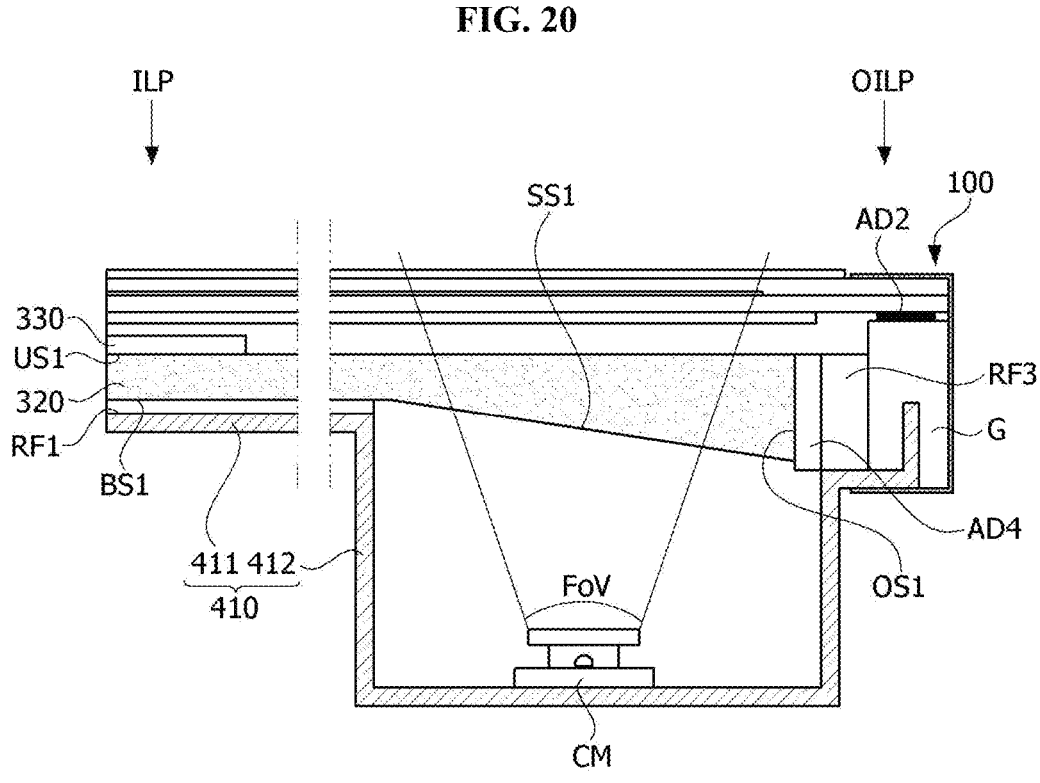
FIG. 20 is a cross-sectional view of a display device according to another modified example of the present disclosure.
Figure 21:
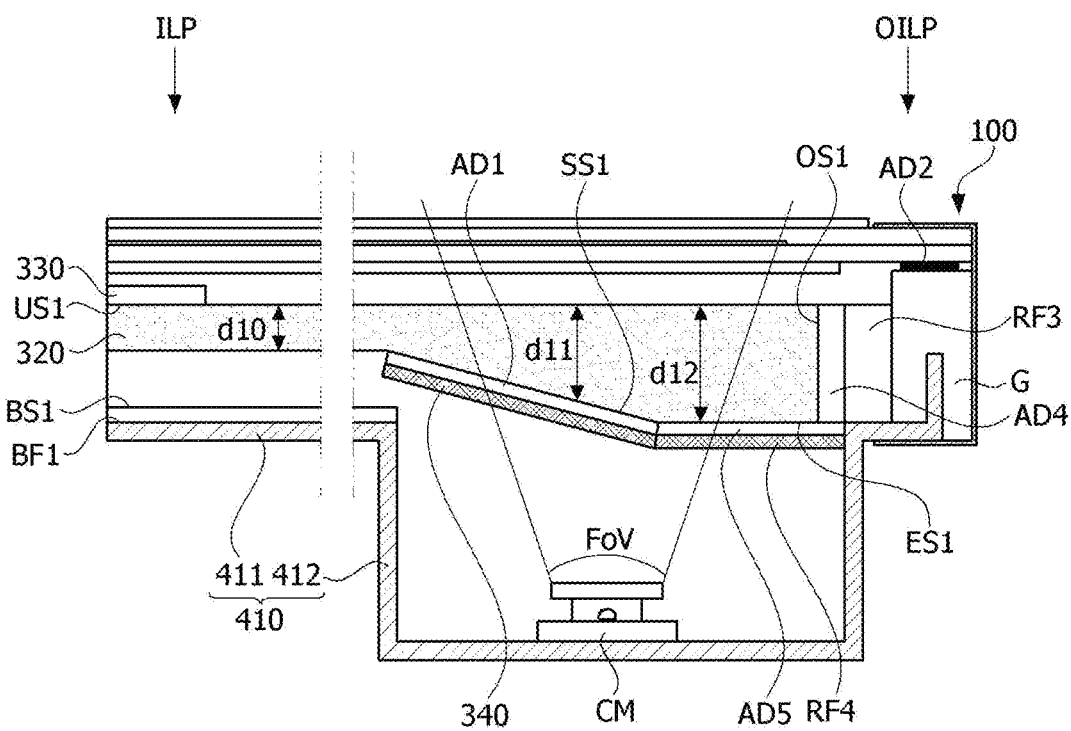
FIG. 21 is a cross-sectional view of a display device according to still another modified example of the present disclosure.

FIG. 20 is a cross-sectional view of a display device according to another modified example, and FIG. 21 is a cross-sectional view of a display device according to still another modified example.

Referring to FIG. 20, a display device according to another modified example can include the display panel 100, a circuit portion, the backlight unit 300, the sensor CM, and a case member. In addition, except for the contents described below, the contents described in other embodiments, etc. can be applied to the present embodiment.

In the present example, the display device can include a third reflective sheet RF3 and a fourth adhesive member AD4. The light guide plate 320 can include the lower surface BS1, the upper surface US1, and the sloped surface SS1. In addition, the light guide plate 320 can include an outermost surface OS1 located on the other side thereof. The outermost surface OS1 can be connected to the sloped surface SS1 and the upper surface US1. For example, the thickness of the light guide plate 320 on the sloped surface SS1 can increase toward the other side of the light guide plate 320. Alterna-tively, the thickness of the light guide plate 320 can increase toward the opposing incident light portion. In addition, the thickness of the light guide plate 320 at the incident light portion can be smaller than the thickness of the light guide plate 320 at the opposing incident light portion.

The third reflective sheet RF3 and the fourth adhesive member AD4 can be located on the outermost surface OS1 of the light guide plate 320. The third reflective sheet RF3 can be formed of a structure and material that induces diffused reflection. In addition, bead coating can be applied to the third reflective sheet RF3.

In addition, the fourth adhesive member AD4 can be formed of a material providing a predetermined haze level (opacity level due to light diffusion). In addition, at least one of the sloped surface and the outermost surface OS1 can have various optical patterns for diffusion. Therefore, even when the amount of light guided not only to the second display area but also to the opposing incident light portion is small, the amount of light output to the display panel 100 overlapping the opposing incident light portion can be increased. Therefore, since the reduction in the dark area can be effectively implemented, and luminance can be uniform through the entirety of the display panel.

Referring to FIG. 21, a display device according to the still another modified example can include the display panel 100, a circuit portion, the backlight unit 300, the sensor CM, and a case member. In addition, except for the contents described below, the contents described in other embodiments, etc. can be applied to the present embodiment.

In the present example, the display device can include the third reflective sheet RF3 and a fourth adhesive member AD4 as described above. In addition, the display device can include a fourth reflective sheet RF4 and a fifth adhesive member AD5.

As described above, the light guide plate 320 can include the lower surface BS1, the upper surface US1, and the sloped surface SS1. In addition, the light guide plate 320 can include the sloped surface SS1 and the flat surface ES1 extending from the sloped surface SS1 to the other side. In addition, the light guide plate 320 can include the outermost surface OS1 located at the other side. The flat surface ES1 can be a flat surface such as the upper surface US1 or the lower surface BS1. Therefore, the light guide plate 320 can have a stepped structure inclined toward the other side thereof. In addition, the outermost surface OS1 can be connected to the sloped surface SS1 and the upper surface US1. For example, the thickness of the light guide plate 320 on the sloped surface SS1 can increase toward the other side of the light guide plate 320. Alternatively, the thickness of the light guide plate 320 can increase toward the opposing incident light portion. In addition, the thickness of the light guide plate 320 at the incident light portion can be smaller than the thickness of the light guide plate 320 at the opposing incident light portion.

More specifically, a thickness d10 of the light guide plate 320 on the lower surface BS1 can be smaller than a thickness d12 of the light guide plate 320 at the flat surface ES1. In addition, a thickness d11 of the light guide plate 320 on the sloped surface SS1 can gradually increase toward the other side or the opposing incident light portion (opposing light portion). For example, a thickness of the light guide plate 320 in an area closest to one side of the light guide plate 320 can be greater than a thickness of the light guide plate 320 in an area closest to the other side of the light guide plate 320.

The third reflective sheet RF3 and the fourth adhesive member AD4 can be located on the outermost surface OS1 of the light guide plate 320. The fourth adhesive member AD4 can be located between the light guide plate 320 and the third reflective sheet RF3.

In addition, the reflector 340 can be disposed under the sloped surface SS1 of the light guide plate 320. In addition, the first adhesive member AD1 can be located between the reflector 340 and the sloped surface SS1.

In addition, the fourth reflective sheet RF4 can be disposed on the flat surface ES1 of the light guide plate 320. The fourth reflective sheet RF4 can reflect light directed downward the light guide plate 320 within the light guide plate 320 to the inside of the light guide plate 320. In addition, the fifth adhesive member AD5 can be located between the light guide plate 320 and the fourth reflective sheet RF4. For example, the fifth adhesive member AD5 can be located between the flat surface ES1 and the fourth reflective sheet RF4.

At least one of the third reflective sheet RF3 and the fourth reflective sheet RF4 can be formed of a structure and material that induces diffused reflection. In addition, bead coating can be applied to at least one of the third reflective sheet RF3 and the fourth reflective sheet RF4.

In addition, at least one of the first adhesive member AD1, the fourth adhesive member AD4 and the fifth adhesive member AD5 can be formed of a material providing a predetermined haze level (opacity level due to light diffusion). In addition, at least one of the flat surface, the sloped surface, and the outermost surface can have various optical patterns for diffusion. Therefore, even when the amount of light guided not only to the second display area but also to the opposing incident light portion is small, the amount of light output to the display panel 100 overlapping the opposing incident light portion can be increased. Therefore, since the reduction in the dark area can be effectively implemented, and luminance can be uniform through the entirety of the display panel.

According to embodiments, an imaging area is not recognized from the outside, a dark area phenomenon in an area where a sensor is disposed can be improved, and light uniformity can be improved.

In addition, it is possible to achieve miniaturization with a narrow bezel and a reduced thickness.

In addition, embodiments can provide a display device that can be easily miniaturized through an extending portion.

Although embodiments of the present disclosure have been described in more detail with reference to the accompanying drawings, the present disclosure is not necessarily limited to these embodiments, and various modifications can be made without departing from the technical spirit of the present disclosure. Therefore, the embodiments disclosed in the present disclosure are not intended to limit the technical spirit of the present disclosure, but intended to describe the same, and the scope of the technical spirit of the present disclosure is not limited by these embodiments. Therefore, it should be understood that the above-described embodiments are illustrative and not restrictive in all respects. The scope of the present disclosure should be construed according to the appended claims, and all technical spirits within the equivalent range should be construed as being included in the scope of the present disclosure.

Various and beneficial advantages and effects of the present disclosure are not limited to the above-described contents and will be more readily understood in a process of describing specific embodiments of the present disclosure.

What is claimed is:

1. A display device comprising:
   a backlight unit;
   a display panel disposed on the backlight unit and including a first display area and a second display area; and
   a sensor disposed under the second display area,
   wherein the backlight unit includes:
   a light guide plate disposed under the first display area and the second display area;

a light source configured to radiate light to the light guide plate; and a reflector disposed between the second display area and the sensor and configured to reflect incident visible light to the second display area, wherein the light source is disposed on one side of the light guide plate, and the reflector is disposed on another side of the light guide plate that faces the one side of the light guide plate, and wherein the light guide plate includes a sloped surface disposed on the another side of the light guide plate, and the reflector is disposed on the sloped surface.

2. The display device of claim 1, wherein light emitted from the sensor passes through the reflector.

3. The display device of claim 2, wherein the light emitted from the sensor is emitted to an outside by passing through the display panel, reflected from an external object, and received by the sensor.

4. The display device of claim 3, wherein the sensor includes an infrared camera.

5. The display device of claim 1, further comprising an optical sheet disposed on the backlight unit, wherein the optical sheet includes an opening corresponding to the second display area.

6. The display device of claim 1, wherein the sloped surface of the light guide plate is disposed in an area overlapping the sensor.

7. The display device of claim 1, wherein the reflector reflects light incident on the light guide plate to the second display area.

8. The display device of claim 1, wherein the light guide plate includes a flat surface extending from the sloped surface to a side opposite to the light source, and the flat surface of the light guide plate overlaps the second display area.

9. The display device of claim 8, wherein a thickness of the light guide plate at the flat surface is less than a thickness of the light guide plate at the sloped surface.

10. The display device of claim 1, further comprising a first prism disposed between the sloped surface of the light guide plate and the sensor.

11. The display device of claim 1, further comprising a light-emitting unit disposed on the another side of the light guide plate, wherein the light guide plate includes an upper surface and a lower surface that are connected to the sloped surface, and the sloped surface does not overlap the upper surface.

12. The display device of claim 11, wherein a thickness of the light guide plate in the second display area decreases toward the another side of the light guide plate.

13. The display device of claim 11, further comprising a second prism disposed between the sloped surface and the display panel.

14. The display device of claim 13, wherein the second prism is disposed between the reflector and the light-emitting unit.

15. The display device of claim 14, wherein the reflector reflects light output from the light source to the sensor, and the reflector reflects light output from the light-emitting unit to the display panel.

16. The display device of claim 1, wherein the light guide plate includes a patterned area overlapping the first display area, and a non-patterned area overlapping the second display area, and wherein the patterned area includes a pattern.

17. The display device of claim 1, wherein the reflector reflects light in a visible wavelength band and transmits light in an infrared wavelength band.

18. The display device of claim 1, wherein the reflector overlaps an area overlapping an opposing incident light portion of the first display area and the second display area.

* * * * *